(12) United States Patent
Ngai et al.

(10) Patent No.: US 11,930,482 B2
(45) Date of Patent: Mar. 12, 2024

(54) TECHNIQUES FOR CARRIER PRIORITIZATION IN MULTI-SUBSCRIBER IDENTITY MODULE FEATURES

(71) Applicant: QUALCOMM Incorporated, San Diego, CA (US)

(72) Inventors: Francis Ming-Meng Ngai, Louisville, CO (US); Arnaud Meylan, San Diego, CA (US); Suli Zhao, San Diego, CA (US); Liangchi Hsu, San Diego, CA (US); Cheol Hee Park, San Diego, CA (US); Qingxin Chen, San Diego, CA (US); Jun Hu, San Diego, CA (US); Leena Zacharias, San Jose, CA (US); Pulkit Hanswal, San Diego, CA (US); Reza Shahidi, San Diego, CA (US); Thawatt Gopal, San Diego, CA (US); Raghu Narayan Challa, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 17/445,073

(22) Filed: Aug. 13, 2021

(65) Prior Publication Data

US 2023/0048785 A1 Feb. 16, 2023

(51) Int. Cl.
*H04W 72/00* (2023.01)
*H04W 72/0453* (2023.01)
(Continued)

(52) U.S. Cl.
CPC ....... *H04W 72/0453* (2013.01); *H04W 72/56* (2023.01); *H04W 76/15* (2018.02); *H04W 88/06* (2013.01)

(58) Field of Classification Search
None
See application file for complete search history.

(56) References Cited

U.S. PATENT DOCUMENTS

2010/0251054 A1* 9/2010 Cai ............... H04L 5/0096
714/E11.131
2016/0087770 A1* 3/2016 Chang ............ H04L 67/1044
370/329
(Continued)

FOREIGN PATENT DOCUMENTS

CN WO2017011976 * 1/2017 ............ H04W 76/04
WO 2017011976 A1 1/2017

OTHER PUBLICATIONS

International Search Report and Written Opinion—PCT/US2022/073883—ISA/EPO—dated Nov. 18, 2022.

*Primary Examiner* — Abdelillah Elmejjarmi
(74) *Attorney, Agent, or Firm* — Dalei Dong; Harrity & Harrity, LLP

(57) ABSTRACT

Various aspects of the present disclosure generally relate to wireless communication. In some aspects, a multi-subscriber identity module (SIM) user equipment (UE) may communicate, using a first SIM, on a plurality of component carriers. The multi-SIM UE may select a first subset of component carriers from the plurality of component carriers based at least in part on a component carrier prioritization. The multi-SIM UE may identify an amount of memory available to a second SIM. The multi-SIM UE may tune away, based at least in part on the amount of memory available to the second SIM, from a second subset of component carriers The first subset of component carriers may be different from the second subset of component carriers. Numerous other aspects are described.

30 Claims, 8 Drawing Sheets

(51) Int. Cl.
*H04W 72/56* (2023.01)
*H04W 76/15* (2018.01)
*H04W 88/06* (2009.01)

(56) References Cited

U.S. PATENT DOCUMENTS

2016/0088635 A1   3/2016  Davydov et al.
2018/0048426 A1*  2/2018  Yang .................... H04L 1/0059
2020/0187208 A1*  6/2020  Hou ..................... H04L 5/0091

* cited by examiner

TECHNIQUES FOR CARRIER PRIORITIZATION IN MULTI-SUBSCRIBER IDENTITY MODULE FEATURES

FIELD OF THE DISCLOSURE

Aspects of the present disclosure generally relate to wireless communication and to techniques and apparatuses for carrier prioritization in multi-subscriber identity module (SIM) features.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include communicating, using a first multi-subscriber identity module (SIM), on a plurality of component carriers. The method may include selecting a subset of component carriers from the plurality of component carriers based at least in part on a component carrier prioritization. The method may include identifying an amount of memory available to a second SIM. The method may include tuning away, based at least in part on the amount of memory available to the second SIM, from a second subset of component carriers of the plurality of component carriers.

In some aspects, the component carrier prioritization is a hierarchical component carrier prioritization.

In some aspects, the selection of the first subset of component carriers further comprises selecting a component carrier, of the plurality of component carriers, associated with a primary cell of a master cell group over other component carriers, of the plurality of component carriers.

In some aspects, the selection of the first subset of component carriers further comprises selecting a component carrier, of the plurality of component carriers, associated with a primary cell of a secondary cell group over other component carriers, of the plurality of component carriers, that are not associated with a primary cell of a master cell group.

In some aspects, the selection of the first subset of component carriers further comprises selecting a millimeter wave component carrier, of the plurality of component carriers, over other component carriers, of the plurality of component carriers, that are not associated with a primary cell of a master cell group and are not associated with a primary cell of a secondary cell group.

In some aspects, the selection of the first subset of component carriers further comprises selecting a millimeter wave component carrier, of the plurality of component carriers, over a component carrier, of the plurality of component carriers, that is associated with a frequency that is less than six gigahertz.

In some aspects, the selection of the first subset of component carriers further comprises selecting an activated component carrier, of the plurality of component carriers, over a configured-only component carrier, of the plurality of component carriers.

In some aspects, the selection of the first subset of component carriers further comprises selecting the configured-only component carrier, of the plurality of component carriers, over another configured-only component carrier, of the plurality of component carriers, based at least in part on the configured-only component carrier being associated with a first bandwidth that is greater than a second bandwidth that is associated with the other configured-only component carrier.

In some aspects, the selection of the first subset of component carriers further comprises selecting the configured-only component carrier, of the plurality of component carriers, over another configured-only component carrier, of the plurality of component carriers, based at least in part on the configured-only component carrier being associated with a first throughput over a time period that is greater than a second throughput over the time period that is associated with the other configured-only component carrier.

In some aspects, the selection of the first subset of component carriers further comprises selecting a first component carrier, of the plurality of component carriers, associated with a first data flow over a second component carrier, of the plurality of component carriers, associated with a second data flow based at least in part on the first data flow being associated with a first type of application and the second data flow being associated with a second type of application.

In some aspects, the first data flow is associated with a higher quality of service (QoS) relative to a QoS of the second data flow.

In some aspects, selecting the first subset of component carriers further comprises deriving a data radio bearer (DRB) associated with the first data flow; and deriving a mapping between the DRB and the first component carrier, wherein the first component carrier is selected over the second component carrier based at least in part on the mapping between the DRB and the first component carrier.

In some aspects, the DRB associated with the first data flow is derived based at least in part on performing downlink packet filtering.

In some aspects, the method includes selecting a first component carrier, of the plurality of component carriers, that has been associated with a first data flow during a time period over a second component carrier, of the plurality of component carriers, based at least in part on the second component carrier being a configured-only component carrier and the second component carrier not having been associated with the first data flow during the time period.

In some aspects, the selection of the first subset of component carriers further comprises selecting a first component carrier, of the plurality of component carriers, that has not been associated with a first data flow during a time period over a second component carrier, of the plurality of component carriers, that has not been associated with the first data flow during the time period based at least in part on one or more of: the first component carrier being associated with a larger bandwidth relative to the second component carrier, or the first component carrier being associated with a larger data throughput during the time period relative to the second component carrier.

In some aspects, the selection of the first subset of component carriers further comprises identifying one or more radio bearers based at least in part on a flow identifier or a quality of service or priority parameter associated with the one or more radio bearers; identifying one or more cell groups corresponding to the one or more radio bearers; and selecting the first subset of component carriers based at least in part on scheduling information associated with a set of component carriers of the one or more cell groups, wherein the first subset of component carriers of interest are included in the set of component carriers.

In some aspects, the method includes dropping one or more transport blocks (TBs) associated with the second subset of component carriers prior to tuning away from the second subset of component carriers.

In some aspects, the method includes transmitting negative feedback on the second subset of component carriers prior to tuning away from the second subset of component carriers.

Some aspects described herein relate to a multi-SIM UE for wireless communication. The multi-SIM UE may include a memory and one or more processors coupled to the memory. The one or more processors may be configured to communicate, using a first SIM, on a plurality of component carriers. The one or more processors may be configured to select a first subset of component carriers from the plurality of component carriers based at least in part on a component carrier prioritization. The one or more processors may be configured to identify an amount of memory available to a second SIM. The one or more processors may be configured to tune away, based at least in part on the amount of memory available to the second SIM, from a second subset of component carriers of the plurality of component carriers. The first subset of component carriers may be different from the second subset of component carriers.

In some aspects, the component carrier prioritization is based at least in part on a hierarchical component carrier prioritization.

In some aspects, the one or more processors, to select the first subset of component carriers, are configured to select a component carrier, of the plurality of component carriers, associated with a primary cell of a master cell group over other component carriers, of the plurality of component carriers.

In some aspects, the one or more processors, to select the first subset of component carriers, are configured to select a component carrier, of the plurality of component carriers, associated with a primary cell of a secondary cell group over other component carriers, of the plurality of component carriers, that are not associated with a primary cell of a master cell group.

In some aspects, the one or more processors, to select the first subset of component carriers, are configured to select a millimeter wave component carrier, of the plurality of component carriers, over other component carriers, of the plurality of component carriers, that are not associated with a primary cell of a master cell group and are not associated with a primary cell of a secondary cell group.

In some aspects, the one or more processors, to select the first subset of component carriers, are configured to select a millimeter wave component carrier, of the plurality of component carriers, over a component carrier, of the plurality of component carriers, that is associated with a frequency that is less than six gigahertz.

In some aspects, the one or more processors, to select the first subset of component carriers, are configured to select an activated component carrier, of the plurality of component carriers, over a configured-only component carrier, of the plurality of component carriers.

In some aspects, the one or more processors, to select the first subset of component carriers, are configured to select the configured-only component carrier, of the plurality of component carriers, over another configured-only component carrier, of the plurality of component carriers, based at least in part on the configured-only component carrier being associated with a first bandwidth that is greater than a second bandwidth that is associated with the other configured-only component carrier.

In some aspects, the one or more processors, to select the first subset of component carriers, are configured to select the configured-only component carrier, of the plurality of component carriers, over another configured-only component carrier, of the plurality of component carriers, based at least in part on the configured-only component carrier being associated with a first throughput over a time period that is greater than a second throughput over the time period that is associated with the other configured-only component carrier.

In some aspects, the one or more processors, to select the first subset of component carriers, are configured to select a first component carrier, of the plurality of component carriers, associated with a first data flow over a second component carrier, of the plurality of component carriers, associated with a second data flow based at least in part on the first data flow being associated with a first type of application and the second data flow being associated with a second type of application.

In some aspects, the first data flow is associated with a higher QoS relative to a QoS of the second data flow.

In some aspects, the one or more processors, to select the first subset of component carriers, are configured to derive a DRB associated with the first data flow; and derive a mapping between the DRB and the first component carrier, wherein the first component carrier is selected over the second component carrier based at least in part on the mapping between the DRB and the first component carrier.

In some aspects, the DRB associated with the first data flow is derived based at least in part on performing downlink packet filtering.

In some aspects the one or more processors, to select the first subset of component carriers, are further configured to select a first component carrier, of the plurality of component carriers, that has not been associated with a first data flow during a time period over a second component carrier, of the plurality of component carriers, that has not been associated with the first data flow during the time period based at least in part on one or more of: the first component carrier being associated with a larger bandwidth relative to the second component carrier, or the first component carrier being associated with a larger data throughput during the time period relative to the second component carrier.

In some aspects, the one or more processors, to select the first subset of component carriers, are further configured to identify one or more radio bearers based at least in part on a flow identifier or a quality of service or priority parameter associated with the one or more radio bearers; identify one or more cell groups corresponding to the one or more radio bearers; and select the first subset of component carriers based at least in part on scheduling information associated with a set of component carriers of the one or more cell groups, wherein the first subset of component carriers are included in the set of component carriers.

In some aspects, the one or more processors are further configured to drop one or more TBs associated with the second subset of component carriers prior to tuning away from the second subset of component carriers.

In some aspects, the one or more processors are further configured to transmit negative feedback on the second subset of component carriers prior to tuning away from the second subset of component carriers.

Some aspects described herein relate to a non-transitory computer-readable medium that stores a set of instructions for wireless communication by a multi-SIM UE. The set of instructions, when executed by one or more processors of the multi-SIM UE, may cause the multi-SIM UE to communicate, using a first SIM, on a plurality of component carriers. The set of instructions, when executed by one or more processors of the multi-SIM UE, may cause the multi-SIM UE to select a first subset of component carriers from the plurality of component carriers based at least in part on a component carrier prioritization. The set of instructions, when executed by one or more processors of the multi-SIM UE, may cause the multi-SIM UE to identify an amount of memory available to a second SIM. The set of instructions, when executed by one or more processors of the multi-SIM UE, may cause the multi-SIM UE to tune away, based at least in part on the amount of memory available to the second SIM, from a second subset of component carriers of the plurality of component carriers. The first subset of component carriers may be different from the second subset of component carriers.

In some aspects, the component carrier prioritization is based at least in part on a hierarchical component carrier prioritization.

In some aspects, the one or more instructions, that cause the multi-SIM UE to select the first subset of component carriers, cause the multi-SIM UE to select a component carrier, of the plurality of component carriers, associated with a primary cell of a master cell group over other component carriers, of the plurality of component carriers.

In some aspects, the one or more instructions, that cause the multi-SIM UE to select the first subset of component carriers, cause the multi-SIM UE to select a component carrier, of the plurality of component carriers, associated with a primary cell of a secondary cell group over other component carriers, of the plurality of component carriers, that are not associated with a primary cell of a master cell group.

In some aspects, the one or more instructions, that cause the multi-SIM UE to select the first subset of component carriers, cause the multi-SIM UE to select a millimeter wave component carrier, of the plurality of component carriers, over other component carriers, of the plurality of component carriers, that are not associated with a primary cell of a master cell group and are not associated with a primary cell of a secondary cell group.

In some aspects, the one or more instructions, that cause the multi-SIM UE to select the first subset of component carriers, cause the multi-SIM UE to select a millimeter wave component carrier, of the plurality of component carriers, over a component carrier, of the plurality of component carriers, that is associated with a frequency that is less than six gigahertz.

In some aspects, the one or more instructions, that cause the multi-SIM UE to select the first subset of component carriers, cause the multi-SIM UE to select an activated component carrier, of the plurality of component carriers, over a configured-only component carrier, of the plurality of component carriers.

In some aspects, the one or more instructions, that cause the multi-SIM UE to select the first subset of component carriers, cause the multi-SIM UE to select the configured-only component carrier, of the plurality of component carriers, over another configured-only component carrier, of the plurality of component carriers, based at least in part on the configured-only component carrier being associated with a first bandwidth that is greater than a second bandwidth that is associated with the other configured-only component carrier.

In some aspects, the one or more instructions, that cause the multi-SIM UE to select the first subset of component carriers, cause the multi-SIM UE to select the configured-only component carrier, of the plurality of component carriers, over another configured-only component carrier, of the plurality of component carriers, based at least in part on the configured-only component carrier being associated with a first throughput over a time period that is greater than a second throughput over the time period that is associated with the other configured-only component carrier.

In some aspects, the one or more instructions, that cause the multi-SIM UE to select the first subset of component carriers, cause the multi-SIM UE to select a first component carrier, of the plurality of component carriers, associated with a first data flow over a second component carrier, of the plurality of component carriers, associated with a second data flow based at least in part on the first data flow being associated with a first type of application and the second data flow being associated with a second type of application.

In some aspects, the first data flow is associated with a higher QoS relative to a QoS of the second data flow.

In some aspects, the one or more instructions, that cause the multi-SIM UE to select the first subset of component carriers, cause the multi-SIM UE to derive a DRB associated with the first data flow; and derive a mapping between the DRB and the first component carrier, wherein the first component carrier is selected over the second component carrier based at least in part on the mapping between the DRB and the first component carrier.

In some aspects, the DRB associated with the first data flow is derived based at least in part on performing downlink packet filtering.

In some aspects, the one or more instructions, that cause the multi-SIM UE to select the first subset of component carriers, cause the multi-SIM UE to select a first component carrier, of the plurality of component carriers, that has not been associated with a first data flow during a time period over a second component carrier, of the plurality of component carriers, that has not been associated with the first data flow during the time period based at least in part on one or more of the first component carrier being associated with a larger bandwidth relative to the second component carrier, or the first component carrier being associated with a larger data throughput during the time period relative to the second component carrier.

In some aspects, the one or more instructions further cause the multi-SIM UE to identify one or more radio bearers based at least in part on a flow identifier or a quality of service or priority parameter associated with the one or more radio bearers; identify one or more cell groups corresponding to the one or more radio bearers; and select the first subset of component carriers based at least in part on scheduling information associated with a set of component carriers of the one or more cell groups, wherein the first subset of component carriers are included in the set of component carriers.

In some aspects, the one or more instructions further cause the multi-SIM UE to drop one or more TBs associated with the second subset of component carriers prior to tuning away from the second subset of component carriers.

In some aspects, the one or more instructions further cause the multi-SIM UE to transmit negative feedback on the second subset of component carriers prior to tuning away from the second subset of component carriers.

Some aspects described herein relate to an apparatus of a multi-SIM UE for wireless communication. The apparatus may include means for communicating, using a first SIM, on a plurality of component carriers. The apparatus may include means for selecting a first subset of component carriers from the plurality of component carriers based at least in part on a component carrier prioritization. The apparatus may include means for identifying an amount of memory available to a second SIM. The apparatus may include means for tuning away, based at least in part on the amount of memory available to the second SIM, from a second subset of component carriers of the plurality of component carriers. The first subset of component carriers may be different from the second subset of component carriers.

In some aspects, the component carrier prioritization is based at least in part on a hierarchical component carrier prioritization.

In some aspects, the means for selecting the first subset of component carriers further comprises means for selecting a component carrier, of the plurality of component carriers, associated with a primary cell of a master cell group over other component carriers, of the plurality of component carriers.

In some aspects, the means for selecting the first subset of component carriers further comprises means for selecting a component carrier, of the plurality of component carriers, associated with a primary cell of a secondary cell group over other component carriers, of the plurality of component carriers, that are not associated with a primary cell of a master cell group.

In some aspects, the means for selecting the first subset of component carriers further comprises means for selecting a millimeter wave component carrier, of the plurality of component carriers, over other component carriers, of the plurality of component carriers, that are not associated with a primary cell of a master cell group and are not associated with a primary cell of a secondary cell group.

In some aspects, the means for selecting the first subset of component carriers further comprises means for selecting a millimeter wave component carrier, of the plurality of component carriers, over a component carrier, of the plurality of component carriers, that is associated with a frequency that is less than six gigahertz.

In some aspects, the means for selecting the first subset of component carriers further comprises means for selecting an activated component carrier, of the plurality of component carriers, over a configured-only component carrier, of the plurality of component carriers.

In some aspects, the means for selecting the first subset of component carriers further comprises means for selecting the configured-only component carrier, of the plurality of component carriers, over another configured-only component carrier, of the plurality of component carriers, based at least in part on the configured-only component carrier being associated with a first bandwidth that is greater than a second bandwidth that is associated with the other configured-only component carrier.

In some aspects, the means for selecting the first subset of component carriers further comprises means for selecting the configured-only component carrier, of the plurality of component carriers, over another configured-only component carrier, of the plurality of component carriers, based at least in part on the configured-only component carrier being associated with a first throughput over a time period that is greater than a second throughput over the time period that is associated with the other configured-only component carrier.

In some aspects, the means for selecting the first subset of component carriers further comprises means for selecting a first component carrier, of the plurality of component carriers, associated with a first data flow over a second component carrier, of the plurality of component carriers, associated with a second data flow based at least in part on the first data flow being associated with a first type of application and the second data flow being associated with a second type of application.

In some aspects, the first data flow is associated with a higher QoS relative to a QoS of the second data flow.

In some aspects, the means for selecting the first subset of component carriers further comprises means for deriving a DRB associated with the first data flow; and means for deriving a mapping between the DRB and the first component carrier, wherein the first component carrier is selected over the second component carrier based at least in part on the mapping between the DRB and the first component carrier.

In some aspects, the DRB associated with the first data flow is derived based at least in part on performing downlink packet filtering.

In some aspects, the means for selecting the first subset of component carriers further comprises means for selecting a first component carrier, of the plurality of component carriers, that has been associated with a first data flow during a time period over a second component carrier, of the plurality of component carriers, based at least in part on the second component carrier being a configured-only component carrier and the second component carrier not having been associated with the first data flow during the time period.

In some aspects, the means for selecting the first subset of component carriers further comprises means for selecting a first component carrier, of the plurality of component carriers, that has not been associated with a first data flow during a time period over a second component carrier, of the plurality of component carriers, that has not been associated with the first data flow during the time period based at least in part on one or more of: the first component carrier being associated with a larger bandwidth relative to the second component carrier, or the first component carrier being associated with a larger data throughput during the time period relative to the second component carrier.

In some aspects, the apparatus includes means for identifying one or more radio bearers based at least in part on a flow identifier or a quality of service or priority parameter associated with the one or more radio bearers; means for identifying one or more cell groups corresponding to the one or more radio bearers; and means for selecting the first subset of component carriers based at least in part on scheduling information associated with a set of component carriers of the one or more cell groups, wherein the first subset of component carriers are included in the set of component carriers.

In some aspects, the apparatus includes means for dropping one or more TBs associated with the second subset of component carriers prior to tuning away from the second subset of component carriers.

In some aspects, the apparatus includes means for transmitting negative feedback on the second subset of component carriers prior to tuning away from the second subset of component carriers.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
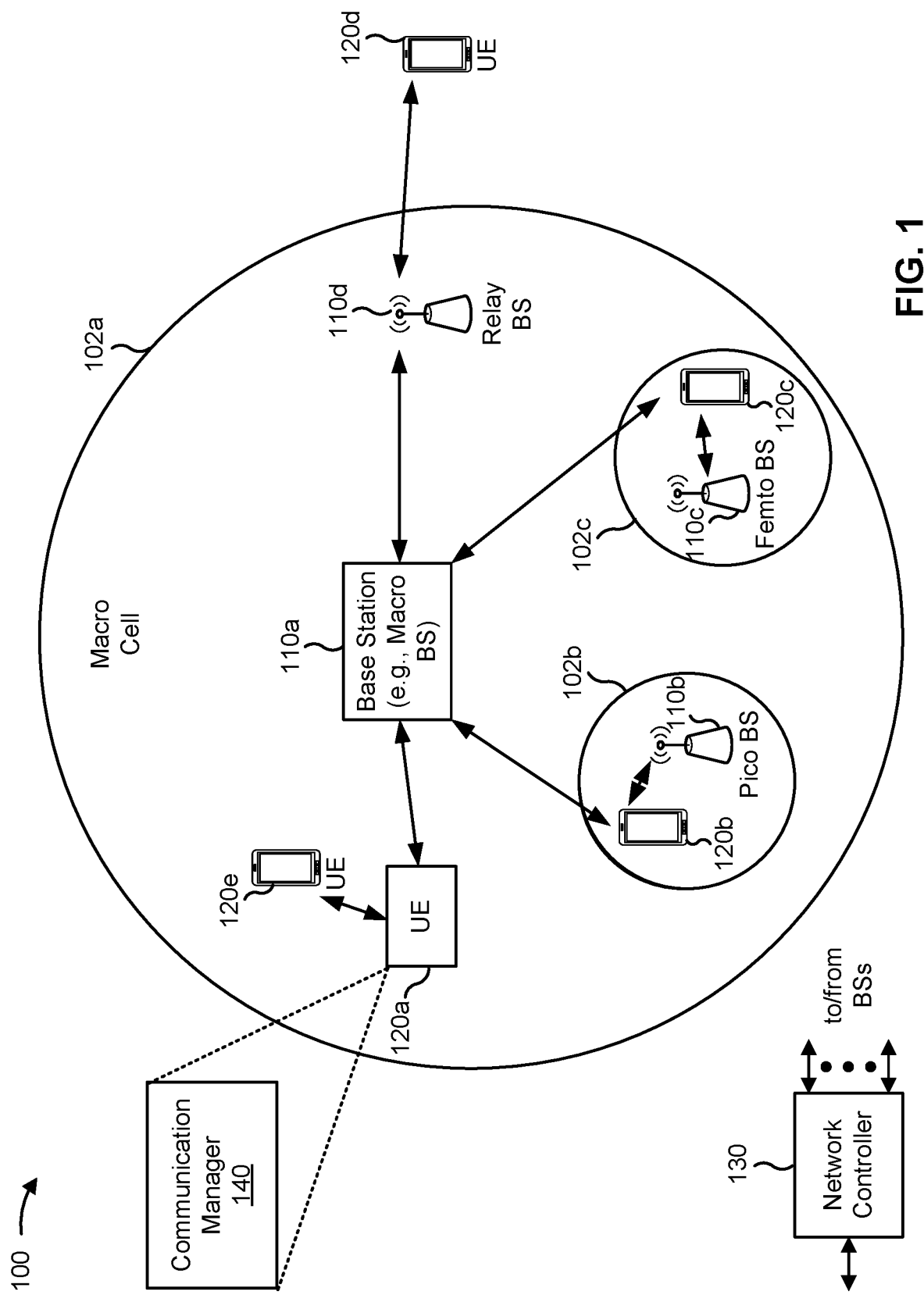
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with carrier prioritization in multi-subscriber identity module (SIM) features. Additionally, or alternatively, the communication manager 140 may perform one or more other operations described herein.

As indicated above, FIG. 1 is provided as an example. Other examples may differ from what is described with regard to FIG. 1.

Figure 2:
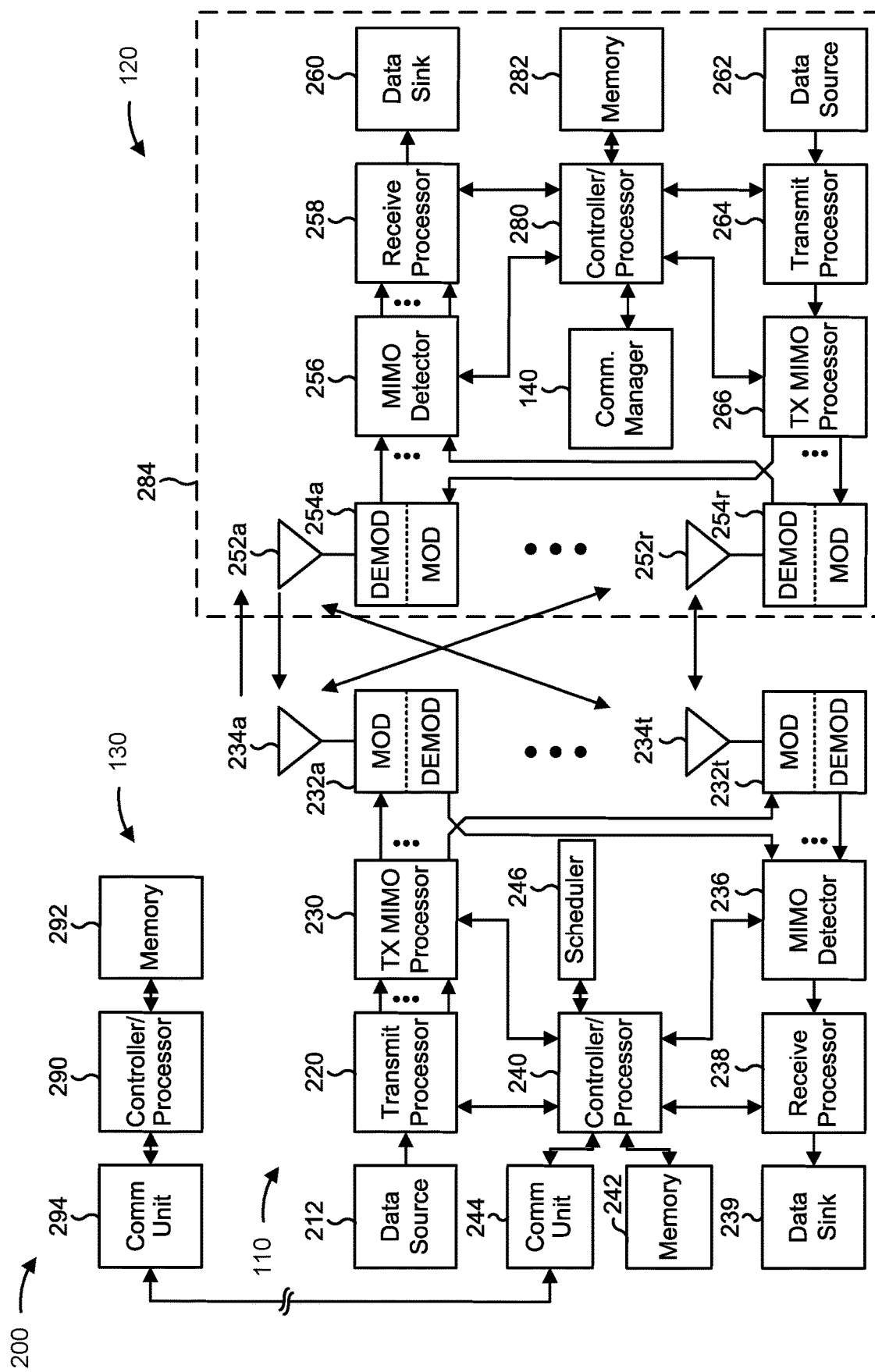
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232.

Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with carrier prioritization in multi-SIM features, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some examples, executing instructions may include running the instructions, converting the instructions, compiling the instructions, and/or interpreting the instructions, among other examples.

In some aspects, UE 120 may include means for communicating, using a first SIM, on a plurality of component carriers, means for selecting a first subset of component carriers from the plurality of component carriers based at least in part on a component carrier prioritization, means for identifying an amount of memory available to a second SIM, means for tuning away, based at least in part on the amount of memory available to the second SIM, from a second subset of component carriers of the plurality of component carriers, wherein the first subset of component carriers is different from the second subset of component carriers, or the like. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
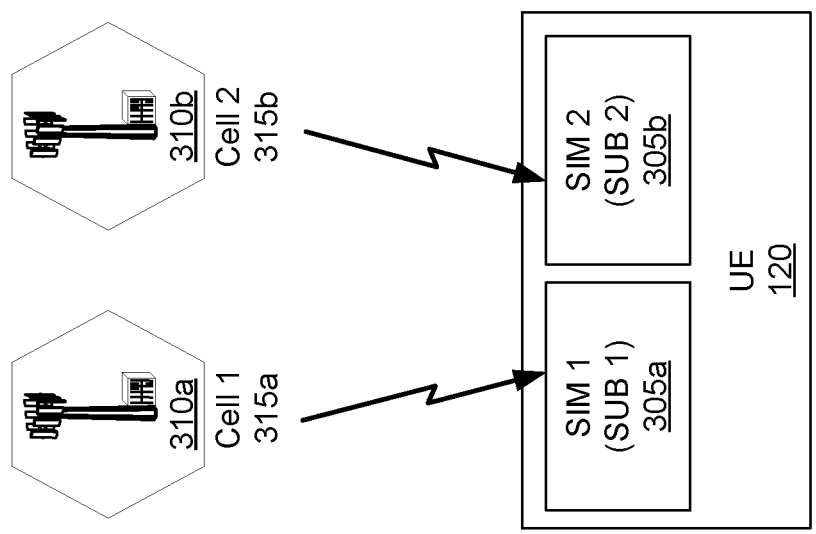
FIG. 3 is a diagram illustrating an example of a multi-subscriber identity module (SIM), in accordance with the present disclosure.

FIG. 3 is a diagram illustrating an example 300 of a multi-SIM UE, in accordance with the present disclosure. As shown in FIG. 3, a UE 120 may be a multi-SIM UE that includes multiple SIMs (two or more SIMs), shown as a first SIM 305a and a second SIM 305b. The first SIM 305a may be associated with a first subscription (shown as SUB 1), and the second SIM 305b may be associated with a second subscription (shown as SUB 2). A subscription may be a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310*a* via a first cell 315*a* (shown as Cell 1) using the first SIM 305*a*. In this case, a first subscription (SUB 1) of the UE 120 may be used to access the first cell 315*a* (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310*b* via a second cell 315*b* (shown as Cell 2) using the second SIM 305*b*. In this case, a second subscription (SUB 2) of the UE 120 may be used to access the second cell 315*b* (for example, using a second IMSI for UE identification, using a second security key for UE authentication, using a second list of services that the UE 120 is permitted to access using the second subscription, or by counting data or voice usage on the second cell against the second subscription, among other examples).

The first base station 310*a* and/or the second base station 310*b* may include one or more of the base stations 110 described above in connection with FIG. 1. Although the first cell 315*a* and the second cell 315*b* are shown as being provided by different base stations, in some aspects, the first cell 315 and the second cell 315*b* may be provided by the same base station. Thus, in some aspects, the first base station 310*a* and the second base station 310*b* may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (SR-MSMA) mode, such as a dual SIM dual active (DSDA) mode (e.g., when the UE 120 is associated with two subscriptions).

In a DSDA mode, the UE 120 is capable of concurrent active communication using both SIMS of the UE 120. Thus, a UE 120 in the DSDA mode is capable of communicating using the first SIM 305*a* (and the first subscription) at the same time as communicating using the second SIM 305*b* (and the second subscription). For example, when the UE 120 is in an active session (e.g., a voice call or another latency sensitive service, such as online gaming, stock trading, or an over-the-top (OTT) service) using the first SIM 305*a*, the UE 120 is capable of receiving a notification of a voice call using the second SIM 305*b* without interrupting communications that use the first SIM 305*a*, and without tuning or switching away from the first cell 315*a* to tune to the second cell 315*b*.

In a DSDS mode, the UE 120 is not capable of concurrent active communication using both SIMS of the UE 120. Thus, a UE 120 in the DSDS mode is not capable of communicating using the first SIM 305*a* (and the first subscription) at the same time as communicating using the second SIM 305*b* (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs and may not be capable of operating in a DSDA mode for a second combination of RATs. For example, the UE 120 may be capable of operating in a DSDA mode for NR+NR, where the first cell 315*a* (as well as the first SIM 305*a* and the first subscription) uses an NR RAT and the second cell 315*b* (as well as the second SIM 305*b* and the second subscription) also uses the NR RAT. However, the UE 120 may not be capable of operating in a DSDA mode for NR+LTE, where one of the first cell 315*a* (as well as the first SIM 305*a* and the first subscription) uses an NR RAT and the second cell 315*b* (as well as the second SIM 305*b* and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. This UE design reduces design costs as compared to enabling the UE 120 to operate using the DSDA mode for the second combination of RATs.

In some cases, when operating in DSDS mode, the first SIM 305*a* and the second SIM 305*b* may share modem resources of the UE. However, each SIM (e.g., the first SIM 305*a* and the second SIM 305*b*) may report to the base station as if each SIM has one hundred percent use of the modem resources. In some cases, therefore, a SIM (e.g., the first SIM 305*a*) may communicate using modem resources allocated to another SIM (e.g., the second SIM 305*b*). In some cases, when the second SIM 305*b* has need of the modem resources allocated to the second SIM 305*b* and those resources are currently being utilized by the first SIM 305*a*, the UE will cause the first SIM 305*a* to tune away (e.g., stop utilizing) the resources allocated to the second SIM 305*b*.

Commonly, the UE randomly selects a quantity of secondary cell (SCell) component carriers to be released (e.g., tuned away) by the first SIM 305*a*. However, the random selection of the quantity of SCell component carriers may result in the disruption or interruption of the flow of traffic associated with the first SIM 305*a*. For example, a randomly selected SCell component carrier may be a component carrier associated with a largest bandwidth, delay sensitive traffic (e.g., traffic associated with a voice call and/or a gaming application, among other examples), and/or a highest downlink and/or uplink throughput during a most recent time period, among other examples, relative to other SCell component carriers that may have been selected by the UE.

Some techniques and apparatuses described herein enable a multi-SIM UE to select a first subset of component carriers and/or to tune away from a second subset of component carriers to avoid unnecessary traffic flow interruptions of traffic that is caused by tuning away from component carriers that are more likely to disrupt the flow of traffic relative to other component carriers. In some aspects, the first subset of component carriers is different from the second subset of component carriers. In some aspects, the first subset of component carriers may be completely different from the second subset of component carriers (e.g., the first subset of component carriers may include a first component carrier, a second component carrier, and a third component carrier and the second subset of component carriers may include a fourth component carrier, a fifth component carrier, and a sixth component carrier). In some aspects, the first subset of component carriers may be partially different from the second subset of component carriers (e.g., the first subset of component carriers may include the first component carrier, the second component carrier, and the third component carrier and the second subset of component carriers may include the third component carrier, the fifth component carrier, and the sixth component carrier).

In some aspects, the multi-SIM UE may identify a plurality of component carriers being utilized by a first SIM to perform a communication. The multi-SIM UE may utilize a component carrier prioritization to prioritize the component carriers and/or to identify a first subset of component carriers corresponding to component carriers of interest (e.g., component carriers that are not to be released or from which are not to be tuned away by the first SIM and/or component carriers component carriers that are more likely to disrupt the flow of traffic relative to other component carriers). For example, the component carrier having a lowest priority may be least likely to disrupt the flow of traffic relative to other component carriers, and a component carrier having a highest priority may be most likely to disrupt the flow of traffic relative to other component carriers. The component carrier prioritization may enable the multi-SIM UE to prioritize the component carriers and/or identify component carriers of interest based at least in part on one or more factors, such as whether the component carrier is an SCell component carrier or a PCell component carrier, whether the component carrier is activated or configured only, an amount of bandwidth associated with the component carrier, a downlink throughput associated with the component carrier, an uplink throughput associated with the component carrier, and/or whether the component carrier is associated with a quality of service (QoS) traffic flow, among other examples.

In this way, a multi-SIM UE may utilize a process for selecting component carriers to be released by a SIM that minimizes a risk of disruption and/or interruption of the traffic associated with the SIM. As a result, the multi-SIM UE may be enabled to select component carriers of interest and/or to tune away from component carriers other than the component carriers of interest. Therefore, the multi-SIM UE may avoid unnecessary traffic flow interruptions that are caused by tuning away from component carriers that are more likely to disrupt the flow of traffic relative to other component carriers.

As indicated above, FIG. 3 is provided as an example. Other examples may differ from what is described with regard to FIG. 3.

Figure 4:
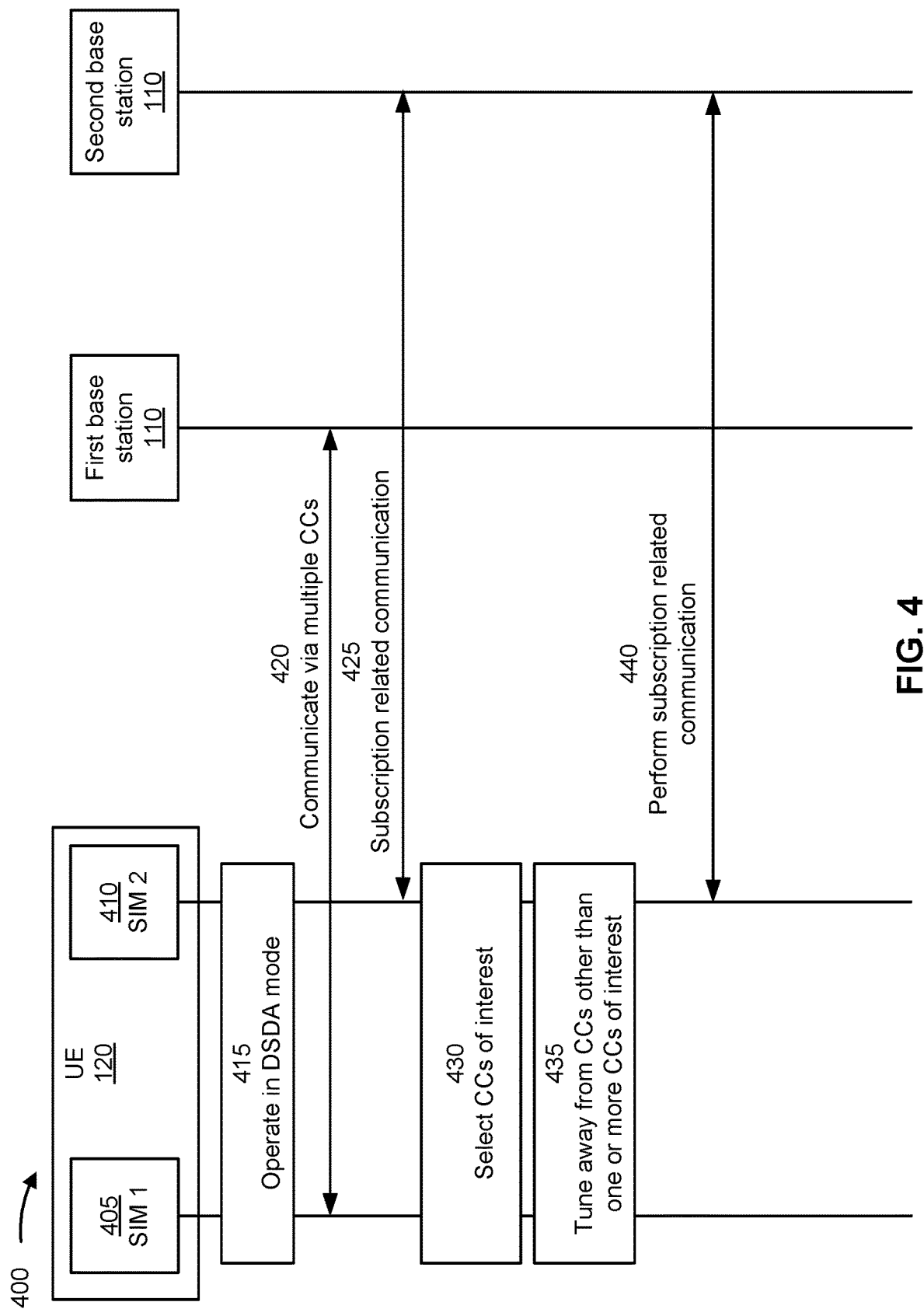
FIGS. 4-6 are diagrams illustrating examples associated with carrier prioritization in multi-SIM features, in accordance with the present disclosure.

FIG. 4 is a diagram illustrating an example 400 associated with carrier prioritization in multi-SIM features, in accordance with the present disclosure. As shown in FIG. 4, a UE 120 may be a multi-SIM UE in a similar manner as described elsewhere herein. For example, the UE 120 may include a first SIM 405 (e.g., SIM 1) and a second SIM 410 (e.g., SIM 2). The first SIM 405 may be associated with a first subscription, and the second SIM 410 may be associated with a second subscription (e.g., in a similar manner as described elsewhere herein).

As described elsewhere herein, a subscription may be a subscription with a network operator (e.g., an MNO) that enables the UE 120 to access a wireless network, such as wireless network 100, associated with the network operator. For example, the UE 120 may access a wireless network associated with a first network operator (e.g., associated with the first SIM 405) via a first base station 110 (e.g., that is associated with the first network operator). Similarly, the UE 120 may access a wireless network associated with a second network operator (e.g., associated with the second SIM 410) via a second base station 110 (e.g., that is associated with the second network operator).

Alternatively, and/or additionally, a base station 110 (e.g., the first base station 110 or the second base station 110) may provide a plurality of cells. The first SIM 405 of the UE 120 may access the wireless network via a first cell of the plurality of cells and the second SIM 410 of the UE 120 may access the wireless network via a second cell of the plurality of cells.

As shown by reference number 415, the UE 120 may operate in a DSDA mode. As described elsewhere herein, in the DSDA mode the UE 120 may be capable of concurrent active communication using both SIMS (e.g., the first SIM 405 and the second SIM 410) of the UE 120. Therefore, the UE 120 in the DSDA mode is capable of communicating using the first SIM 405 (and the first subscription) at the same time as communicating using the second SIM 410 (and the second subscription). For example, each SIM may store an IMSI number and keys associated with providing identification and authentication of the UE 120. In the DSDA mode, the UE 120 may be permitted to communicate using both SIMs simultaneously on two different carriers (e.g., a first carrier associated with the first base station 110 and a second carrier associated with the second base station 110). The two carriers may be associated with the same RAT or different RATs.

The UE 120 may configure a first channel associated with the first SIM 405. For example, the UE 120 may configure the first channel between the UE 120 (e.g., and the first SIM 405) and the first base station 110. The UE 120 may configure a second channel associated with the second SIM 410. For example, the UE 120 may configure the second channel between the UE 120 (e.g., and the second SIM 410) and the second base station 110.

In some aspects, the UE 120 may use the first channel for traffic, such as subscription specific traffic of the first SIM 405 and/or data traffic, among other examples. The UE 120 may use the second channel for traffic, such as subscription specific traffic of the second SIM 410 and/or voice call traffic, among other examples.

As shown by reference number 420, the UE 120 may perform a communication (e.g., transmit and/or receive traffic) with the first base station 110 using the first channel via multiple component carriers. For example, the UE 120 may establish a data connection (e.g., an internet connection) with the first base station 110 (e.g., using the first channel) via an interface associated with the first SIM 405 and may communicate with the first base station 110 on a plurality of component carriers.

As shown by reference number 425, the second base station 110 may initiate a subscription related communication between the UE 120 and the second base station 110. In some aspects, the subscription related communication may be traffic of the UE 120 that is associated with, or specific to, a subscription of the second SIM 410. For example, the subscription related communication may include a voice call and/or a video call (e.g., a video telephone call), among other examples, associated with the second SIM 410.

The UE 120 may determine that one or more component carriers, of the multiple component carriers associated with the first SIM 405, are required to perform the communication between the second SIM 410 and the second base station 110.

As shown by reference number 430, the UE 120 may select one or more component carriers of interest from the multiple component carriers. For example, the UE 120 may select a first subset of component carriers from the plurality of component carriers. A component carrier of interest (that is, a component carrier of the first subset of component carriers) may include a component carrier that is more likely to disrupt the flow of traffic of the first SIM 405 relative to other component carriers as a result of the first SIM 405 tuning away from the component carrier of interest.

In some aspects, the UE 120 may select the one or more component carriers of interest based at least in part on a component carrier prioritization. In some aspects, the component carrier prioritization may be a hierarchical component carrier prioritization, as described in greater detail elsewhere herein, such as below with respect to FIGS. 5 and 6.

In some aspects, the UE 120 may assign a priority to each component carrier, of the multiple component carriers, based at least in part on the component carrier prioritization. In some aspects, a component carrier assigned a lowest priority (e.g., a priority that is less than a priority threshold) may not be identified as a component carrier of interest and/or may be a component carrier that is least likely to disrupt the flow of traffic of the first SIM 405 relative to other component carriers as a result of the first SIM 405 tuning away from the component carrier. In some aspects, a component carrier assigned a highest priority (e.g., a priority that is greater than a priority threshold) may be identified as a component carrier of interest and/or may be a component carrier that is most likely to disrupt the flow of traffic of the first SIM 405 relative to other component carriers as a result of the first SIM 405 tuning away from the component carrier.

In some aspects, the UE 120 may select a quantity of component carriers that are not identified as component carriers of interest. The UE 120 may select the quantity of component carriers beginning with a component carrier that is not identified as a component carrier of interest and/or is associated with a lowest priority. In some aspects, the multi-SIM UE may continue selecting component carriers based at least in part on a priority assigned to the component carriers until a condition is satisfied. For example, the quantity of component carriers that are not identified as component carriers of interest may satisfy a condition associated with the second SIM 410. In some aspects, the condition may be associated with a quantity of available memory to be utilized by the second SIM 410. For example, the UE 120 may identify the quantity of available memory to be utilized by the second SIM 410 (such as based at least in part on making the quantity of available memory available for the second SIM 410, monitoring an operation state of the second SIM 410, or the like). The quantity of component carriers may be based at least in part on the quantity of available memory. Alternatively, and/or additionally, the condition may be associated with a quantity of available modem resources and/or other physical resources of the UE 120 to be utilized by the second SIM 410.

As shown by reference number 435, the UE 120 may cause the first SIM 405 to tune away from one or more component carriers other than one or more component carriers of interest. As shown by reference number 440, the UE 120 (e.g., the second SIM 410) may perform the subscription related communication with the second base station 110 based at least in part on the first SIM 405 tuning away from the one or more component carriers that are not identified as component carriers of interest. In some aspects, the UE 120 may tune away from the one or more component carriers that are not identified as component carriers of interest until a condition (such as the condition associated with the quantity of available memory for the second SIM 410) is no longer satisfied.

As indicated above, FIG. 4 is provided as an example. Other examples may differ from what is described with regard to FIG. 4.

Figure 5:
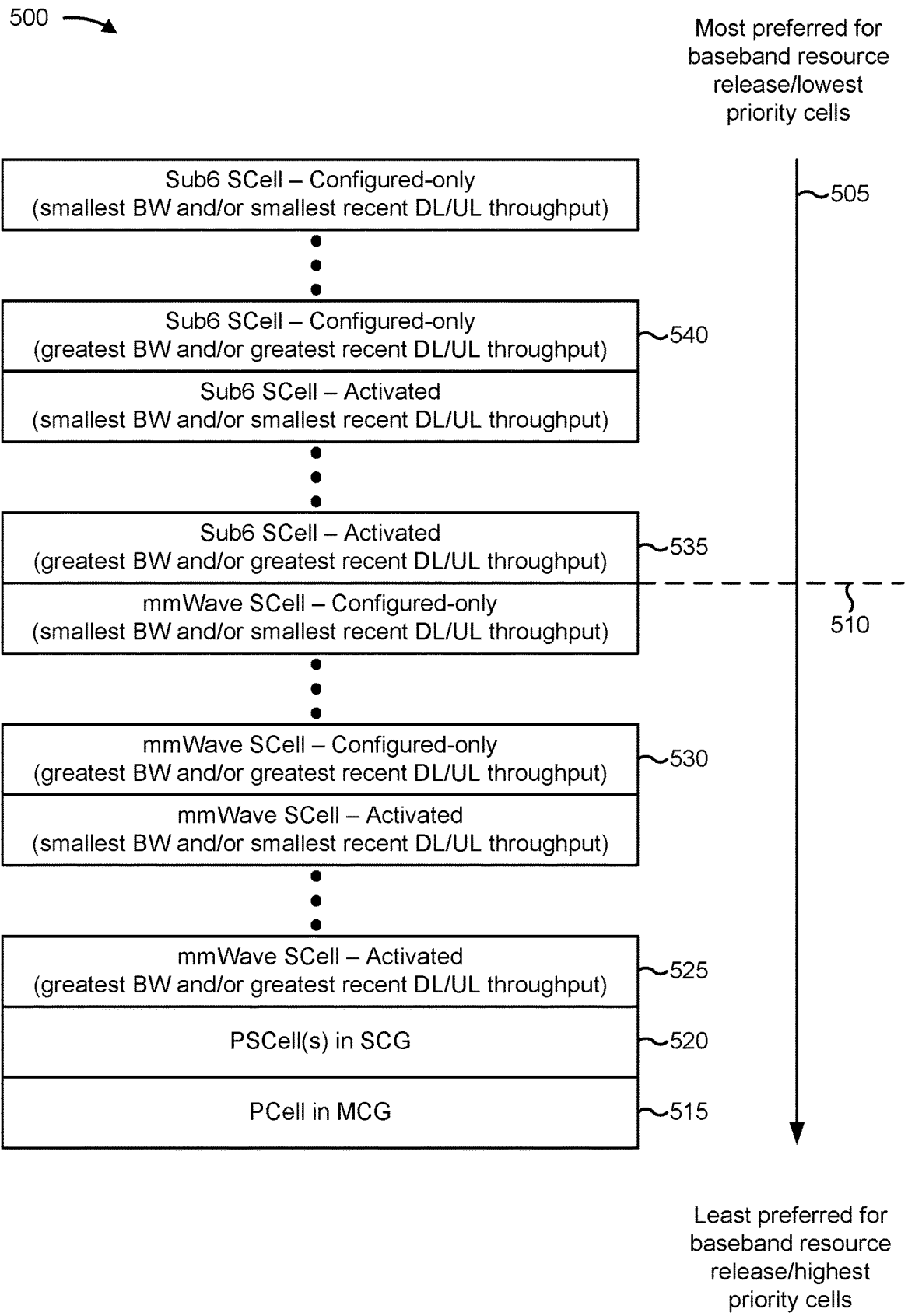

FIG. 5 is a diagram illustrating an example 500 associated with carrier prioritization in multi-SIM features, in accordance with the present disclosure. As shown in FIG. 5, example 500 includes a hierarchical component carrier prioritization for selecting one or more component carriers of interest. As shown in FIG. 5, the hierarchical component carrier prioritization may prioritize or rank cells associated with a first SIM of a multi-SIM UE (e.g., UE 120) based at least in part on a likelihood that tuning away from the cells will disrupt a communication associated with the first SIM.

As shown by reference number 505, the hierarchical component carrier prioritization may prioritize or rank the cells within a range from cells most preferred for baseband resource release (e.g., cells most preferred to be tune away from by the first SIM) and/or cells assigned a lowest priority to cells least preferred for baseband resource release and/or cells assigned a highest priority. The multi-SIM UE may select component carriers as component carriers of interest based at least in part on the prioritization and/or ranking of the cells.

In some aspects, the multi-SIM UE may select the component carriers of interest based at least in part on the component carriers of interest being associated with cells assigned a priority that satisfies a priority threshold, indicated by reference number 510. In some implementations, the multi-SIM UE may determine the priority threshold based at least in part on a frequency associated with the component carriers and/or a frequency associated with the cells, among other examples. For example, as shown in FIG. 5, the priority threshold may be determined such that a priority assigned to a component carrier associated with millimeter wave frequencies satisfies the priority threshold and/or may be selected as a component carrier of interest.

As shown by reference number 515, a primary cell (PCell) of a master cell group (MCG) may be prioritized over all cells associated with a first SIM of a multi-SIM UE. For example, a multi-sim UE (e.g., UE 120) may assign to the PCell a first priority based at least in part on the PCell being a primary cell of an MCG. In some aspects, the first priority may be a highest priority. For example, the first priority may be a higher priority relative to a priority assigned to all other cells associated with the first SIM.

In some aspects, the multi-SIM UE may determine that the first SIM is not to tune away from a component carrier associated with a PCell. In some aspects, the multi-SIM UE may select a component carrier associated with the PCell as a component carrier of interest based at least in part on the component carrier being associated with the PCell and/or based at least in part on the PCell being assigned the first priority.

As shown by reference number 520, a primary cell (PSCell) of a secondary cell group (SCG) may be prioritized over all cells associated with a first SIM of a multi-SIM UE that are not of the MCG. For example, the multi-sim UE may assign the PSCell a second priority based at least in part on the PSCell being a primary cell of an SCG. In some aspects, the second priority may be a second highest priority. For example, the first priority may be a higher priority relative to the second priority and the second priority may be a higher priority relative to a priority assigned to all other cells associated with the first SIM.

In some aspects, the multi-SIM UE may determine that the first SIM is not to tune away from a component carrier associated with the PSCell. In some aspects, the multi-SIM UE may select a component carrier associated with the PSCell as a component carrier of interest based at least in part on the component carrier being associated with the PSCell and/or based at least in part on the PSCell being assigned the second priority.

As shown by reference number 525, an activated SCell associated with a millimeter wave frequency may be prioritized over all cells associated with a first SIM of a multi-SIM UE that are not of the MCG or the SCG. For example, the multi-sim UE may assign the activated SCell associated with a millimeter wave frequency a third priority based at least in part on the SCell being activated and associated with a millimeter wave frequency. In some aspects, the third priority may be a third highest priority. For example, the first and second priorities may be higher priorities relative to the third priority and the third priority may be a higher priority relative to a priority assigned to all other cells associated with the first SIM.

In some aspects, the multi-SIM UE may determine that the first SIM is not to tune away from a component carrier associated with an SCell associated with a millimeter wave frequency. For example, the multi-SIM UE may determine that the first SIM is only to tune away from component carriers associated with SCells associated with a frequency that is less than six gigahertz (e.g., a sub6 frequency). In some aspects, the multi-SIM UE may select a component carrier associated with the activated SCell associated with a millimeter wave frequency as a component carrier of interest based at least in part on the component carrier being associated with the activated SCell and/or based at least in part on the activated SCell being associated with the millimeter wave frequency. Alternatively, and/or additionally, the multi-SIM UE may select the component carrier associated with the activated SCell associated with the millimeter wave frequency as a component carrier of interest based at least in part on the activated SCell associated with the millimeter wave frequency being assigned the third priority and the third priority being greater than the priority threshold.

In some aspects, the first SIM may be associated with a plurality of activated SCells associated with the millimeter wave frequency. The multi-SIM UE may prioritize or rank each SCell, of the plurality of activated SCells associated with the millimeter wave frequency, relative to the other SCells of the plurality of activated SCells associated with the millimeter wave frequency. In some aspects, the multi-SIM UE may rank the plurality of activated SCells associated with the millimeter wave frequency based at least in part on a respective amount of bandwidth associated with each SCell. For example, the multi-SIM UE may assign a first SCell, of the plurality of activated SCells associated with the millimeter wave frequency a first sub-priority within the third priority based at least in part on the first SCell being associated with a first bandwidth. The first sub-priority may be a higher priority relative to a second sub-priority assigned to a second SCell associated with a second bandwidth that is less than the first bandwidth.

In some aspects, the multi-SIM UE may rank the plurality of activated SCells associated with the millimeter wave frequency based at least in part on a respective throughput (e.g., an uplink throughput and/or a downlink throughput) associated with each SCell. For example, the multi-SIM UE may assign a first SCell, of the plurality of activated SCells associated with the millimeter wave frequency, a first sub-priority within the third priority based at least in part on the first SCell being associated with a first throughput during a recent time period (e.g., a time period corresponding to a current radio resource control (RRC) connected state). The first sub-priority may be a higher priority relative to a second sub-priority assigned to a second SCell associated with a second throughput that is less than the first throughput.

As shown by reference number 530, a configured-only SCell (e.g., an SCell that has not been activated and/or an SCell that has been deactivated) associated with the millimeter wave frequency may be prioritized over all cells associated with a first SIM of a multi-SIM UE that are not of the MCG or the SCG and are not activated SCells associated with the millimeter wave frequency. For example, the multi-sim UE may assign the configured-only SCell associated with a millimeter wave frequency a fourth priority based at least in part on the SCell being configured but not activated and associated with a millimeter wave frequency. In some aspects, the fourth priority may be a fourth highest priority. For example, the first, second, and third priorities may be higher priorities relative to the fourth priority, and the fourth priority may be a higher priority relative to a priority assigned to all other cells (e.g., all cells associated with a sub6 frequency) associated with the first SIM.

In some aspects, the multi-SIM UE may select a component carrier associated with the configured-only SCell associated with a millimeter wave frequency as a component carrier of interest based at least in part on the component carrier being associated with the configured-only SCell and/or based at least in part on the configured-only SCell being associated with the millimeter wave frequency. Alternatively, and/or additionally, the multi-SIM UE may select the component carrier associated with the configured-only SCell associated with the millimeter wave frequency as a component carrier of interest based at least in part on the configured-only SCell associated with the millimeter wave frequency being assigned the fourth priority, and the fourth priority being greater than the priority threshold.

In some aspects, the first SIM may be associated with a plurality of configured-only SCells associated with the millimeter wave frequency. The multi-SIM UE may prioritize or rank each SCell, of the plurality of configured-only SCells associated with the millimeter wave frequency, relative to the other SCells of the plurality of configured-only SCells associated with the millimeter wave frequency. In some aspects, the multi-SIM UE may rank the plurality of configured-only SCells associated with the millimeter wave frequency based at least in part on a respective amount of bandwidth associated with each SCell and/or a respective throughput during a time period associated with the each SCell, in a manner similar to that described elsewhere herein.

As shown by reference number 535, an activated SCell associated with a sub6 frequency may be prioritized over all cells associated with a first SIM of a multi-SIM UE that are not of the MCG or the SCG and are not associated with the millimeter wave frequency. For example, the multi-sim UE may assign the activated SCell associated with a sub6 frequency a fifth priority based at least in part on the SCell being activated and associated with a sub6 frequency. In some aspects, the fifth priority may be a fifth highest priority. For example, the first, second, third, and fourth priorities may be higher priorities relative to the fifth priority, and the fifth priority may be a higher priority relative to a priority assigned to all other cells (e.g., all cells associated with a configured-only cell associated with sub6 frequency) associated with the first SIM.

In some aspects, the multi-SIM UE may determine that the fifth priority does not satisfy the priority threshold. The multi-SIM UE may not select a component carrier associated with the activated SCell associated with a sub6 frequency as a component carrier of interest based at least in part on the fifth priority failing to satisfy the priority threshold.

In some aspects, the first SIM may be associated with a plurality of activated SCells associated with the sub6 frequency. The multi-SIM UE may prioritize or rank each SCell, of the plurality of activated SCells associated with the sub6 frequency, relative to the other SCells of the plurality of activated SCells associated with the sub6 frequency. In some aspects, the multi-SIM UE may rank the plurality of activated SCells associated with the sub6 frequency based at least in part on a respective amount of bandwidth associated with each SCell and/or a respective throughput during a time period associated with the each SCell, in a manner similar to that described elsewhere herein.

As shown by reference number 540, a configured-only SCell associated with a sub6 frequency may be assigned a sixth priority. The sixth priority may be a lowest priority relative to all other cells associated with the first SIM. In some aspects, the multi-SIM UE may determine that the sixth priority does not satisfy the priority threshold. The multi-SIM UE may not select a component carrier associated with the configured-only SCell associated with a sub6 frequency as a component carrier of interest based at least in part on the sixth priority failing to satisfy the priority threshold.

In some aspects, the first SIM may be associated with a plurality of configured-only SCells associated with the sub6 frequency. The multi-SIM UE may prioritize or rank each SCell, of the plurality of configured-only SCells associated with the sub6 frequency, relative to the other SCells of the plurality of configured-only SCells associated with the sub6 frequency. In some aspects, the multi-SIM UE may rank the plurality of configured-only SCells associated with the sub6 frequency based at least in part on a respective amount of bandwidth associated with each SCell and/or a respective throughput during a time period associated with the each SCell, in a manner similar to that described elsewhere herein.

As indicated above, FIG. 5 is provided as an example. Other examples may differ from what is described with respect to FIG. 5.

Figure 6:
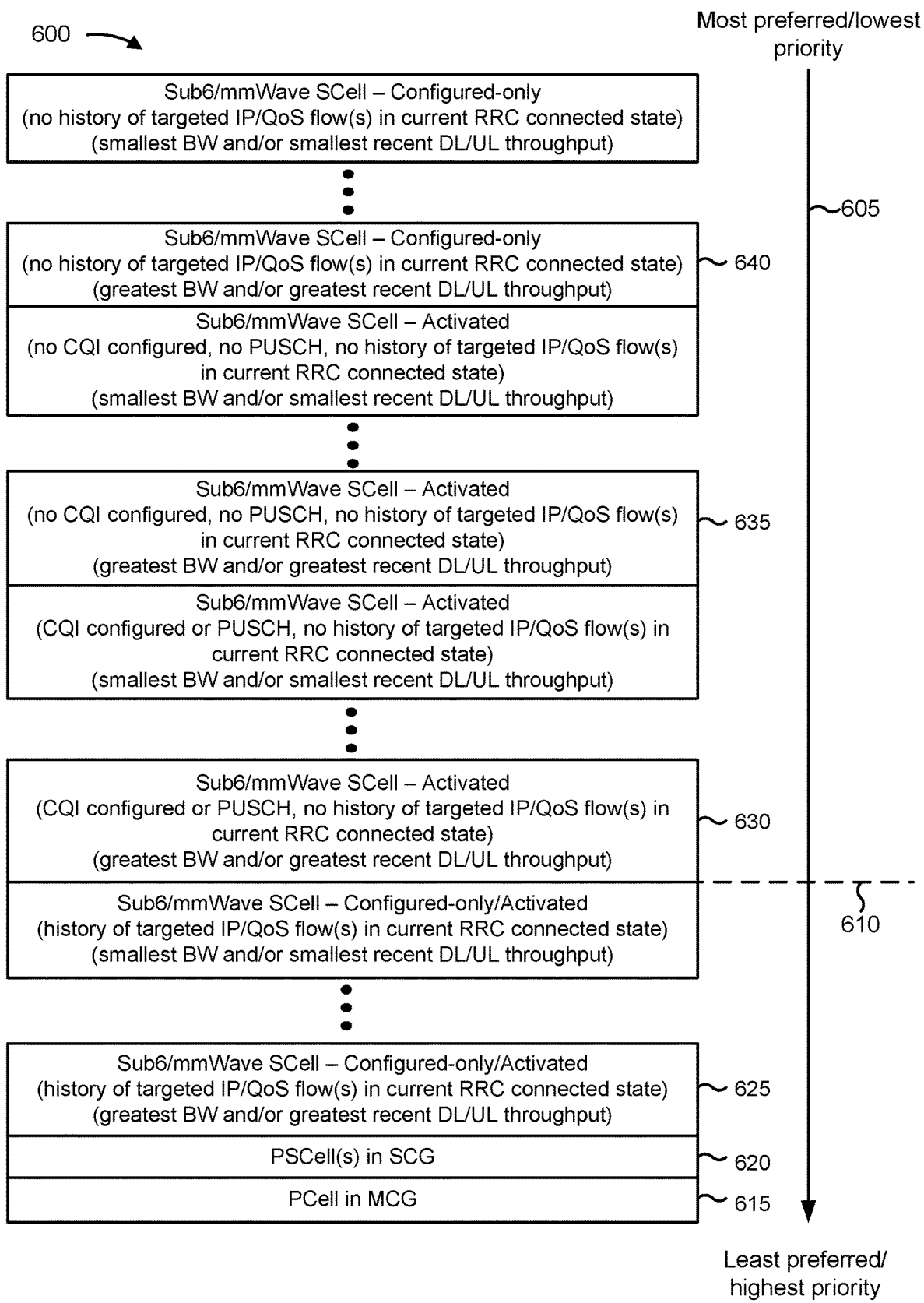

FIG. 6 is a diagram illustrating an example 600 associated with carrier prioritization in multi-SIM features, in accordance with the present disclosure. As shown in FIG. 6, example 600 includes a hierarchical component carrier prioritization for selecting one or more component carriers of interest. The hierarchical component carrier prioritization may enable a multi-SIM UE (e.g., UE 120) to prioritize or rank cells associated with a first SIM of the multi-SIM UE based at least in part on a type of traffic flow (e.g., a targeted Internet protocol (IP) flow and/or a QoS flow, among other examples) associated with the cells during a time period corresponding to a current RRC connected state.

As shown by reference number 605, the hierarchical component carrier prioritization may prioritize or rank the cells within a range from cells most preferred for baseband resource release (e.g., cells most preferred to be tune away from by the first SIM) and/or cells assigned a lowest priority to cells least preferred for baseband resource release and/or cells assigned a highest priority. The multi-SIM UE may select component carriers as component carriers of interest based at least in part on the prioritization and/or ranking of the cells.

In some aspects, the multi-SIM UE may select the component carriers of interest based at least in part on the component carriers of interest being associated with cells assigned a priority that satisfies a priority threshold, indicated by reference number 510. In some implementations, the multi-SIM UE may determine the priority threshold based at least in part on whether the component carriers and/or the cells have been associated with targeted IP flows and/or QoS flows during a time period. For example, as shown by reference number 610, the priority threshold may be determined such that a priority assigned to a component carrier associated with a cell associated with a targeted IP flow and/or a QoS flow during a current RRC connected state satisfies the priority threshold and/or may be selected as a component carrier of interest.

As shown by reference number 615, a PCell of an MCG may be prioritized over all cells associated with a first SIM of a multi-SIM UE. For example, a multi-sim UE (e.g., UE 120) may assign to the PCell a first priority based at least in part on the PCell being a primary cell of an MCG. In some aspects, the first priority may be a highest priority. For example, the first priority may be a higher priority relative to a priority assigned to all other cells associated with the first SIM.

In some aspects, the multi-SIM UE may determine that the first SIM is not to tune away from a component carrier associated with a PCell. In some aspects, the multi-SIM UE may select a component carrier associated with the PCell as a component carrier of interest based at least in part on the component carrier being associated with the PCell and/or based at least in part on the PCell being assigned the first priority.

As shown by reference number 620, a PSCell may be prioritized over all cells associated with a first SIM of a multi-SIM UE that are not of the MCG. For example, the multi-sim UE may assign the PSCell a second priority based at least in part on the PSCell being a primary cell of an SCG. In some aspects, the second priority may be a second highest priority. For example, the first priority may be a higher priority relative to the second priority, and the second priority may be a higher priority relative to a priority assigned to all other cells associated with the first SIM.

In some aspects, the multi-SIM UE may determine that the first SIM is not to tune away from a component carrier associated with the PSCell. In some aspects, the multi-SIM UE may select a component carrier associated with the PSCell as a component carrier of interest based at least in part on the component carrier being associated with the PSCell and/or based at least in part on the second priority being greater than the priority threshold.

As shown by reference number 625, an SCell associated with a history of targeted IP flows and/or QoS flows may be prioritized over all cells that are not of the MCG or the SCG. In some aspects, the multi-SIM UE may identify an SCell associated with a history of targeted IP flows and/or QoS flows based at least in part on identifying radio bearers (e.g., a data radio bearer and/or a signaling radio bearer) of interest.

In some aspects, the multi-SIM UE may identify the radio bearers based on an IP flow identifier. For example, the multi-SIM UE may receive a 5-tuple of an IP flow, an IP QoS indicator (e.g., a differentiated services code point (DSCP) field), and/or a transport protocol (e.g., user datagram protocol (UDP)), among other examples, associated with a targeted IP flow. The multi-SIM UE may map the IP flow to a Layer 2 data radio bearer (DRB) identifier. The multi-SIM UE may determine a radio bearer QoS property (e.g., a QoS class identifier (CQI)) and/or a Layer 2 priority associated with the DRB identifier. The multi-SIM UE may determine that a radio bearer with a QoS property corresponding to QoS property of the radio bearer and/or the Layer 2 priority associated with the DRB is a radio bearer of interest. Alternatively, and/or additionally, the multi-SIM UE may determine that any signaling radio bearer, or a subset of a signaling radio bearer, is a radio bearer of interest.

For each radio bearer of interest, the multi-SIM UE may identify a cell group of interest based at least in part on a cell group mapping configuration. For example, the multi-SIM UE may obtain a cell group mapping configuration (e.g., from RRC) that configures a radio bearer of interest to use only cells of the MCG, only cells of the SCG, or cells of the MCG and cells of the SCG. The multi-SIM UE may identify the MCG as a cell group of interest when the cell group mapping configuration configures the radio bearer of interest to use only cells of the MCG. The multi-SIM UE may identify the SCG as a cell group of interest when the cell group mapping configuration configures the radio bearer of interest to use only cells of the SCG.

In some aspects, a radio bearer of interest is configured to use cells of the MCG and cells of the SCG. The multi-SIM UE may determine cells actually utilized for the radio bearer of interest. For example, for traffic associated with the radio bearer of interest received by the multi-SIM UE from the network (e.g., base station 110), the network may utilize a single cell group (e.g., cells of the MCG or cells of the SCG) for communicating traffic associated with the radio bearer of interest. For traffic associated with the radio bearer of interest transmitted by the multi-SIM UE to the network (e.g., base station 110), the multi-SIM UE may determine whether the traffic associated with the radio bearer of interest was transmitted via cells of the MCG and/or cells of the SCG based at least in part on past scheduling of the traffic by the multi-SIM UE. The multi-SIM UE may identify the MCG as a cell group of interest when a cell of the MCG is actually used to transmit traffic associated with the radio bearer of interest. The multi-SIM UE may identify the SCG as a cell group of interest when a cell of the SCG is actually used to transmit traffic associated with the radio bearer of interest.

In some aspects, the multi-SIM UE, for each cell group of interest, the multi-SIM UE may collect scheduling statistics associated with the cell group of interest. The multi-SIM UE may identify a component carrier used to transport traffic having a radio bearer identifier associated with the radio bearer of interest based at least in part on the scheduling statistics. In some aspects, the DRB associated with a data flow is derived based at least in part on performing downlink packet filtering.

In some aspects, the multi-SIM UE may prioritize a first group of SCells associated with a component carrier used to transport traffic associated with a radio bearer of interest (e.g., a targeted IP flow and/or a QoS flow) over SCells that are not associated with a component carrier used to transport traffic associated with a radio bearer of interest. In some aspects, within the first group of SCells, the multi-SIM UE may prioritize a SCell relative to other SCells based at least in part on a frequency associated with the SCell, an amount of bandwidth associated with the SCell during a recent time period (e.g., a current RRC connected state), and/or a throughput (e.g., a downlink throughput and/or an uplink throughput) associated with the SCell during the time period, in a manner similar to that described elsewhere herein.

In some aspects, within the group of cells that are not associated with a component carrier used to transport traffic associated with a radio bearer of interest, the multi-SIM UE may prioritize activated cells over configured only cells. As shown by reference number 630, within the group of activated cells that are not associated with a component carrier used to transport traffic associated with a radio bearer of interest, the multi-SIM UE may prioritize a group of activated cells that are associated with a CQI configuration and/or a physical uplink shared channel (PUSCH) over activated cells that are not associated with a CQI configuration and/or a PUSCH.

In some aspects, within the group of activated cells that are associated with a CQI configuration and/or a PUSCH, the multi-SIM UE may prioritize an activated SCell relative to other activated SCells based at least in part on a frequency associated with the SCell, an amount of bandwidth associated with the SCell during a recent time period (e.g., a current RRC connected state), and/or a throughput (e.g., a downlink throughput and/or an uplink throughput) associated with the SCell during the time period, in a manner similar to that described elsewhere herein.

Similarly, in some aspects, within the group of activated cells that are not associated with a CQI configuration and/or a PUSCH, the multi-SIM UE may prioritize an activated SCell relative to other activated SCells based at least in part on a frequency associated with the SCell, an amount of bandwidth associated with the SCell during a recent time period (e.g., a current RRC connected state), and/or a throughput (e.g., a downlink throughput and/or an uplink throughput) associated with the SCell during the time period, in a manner similar to that described elsewhere herein.

As shown by reference number 635, the multi-SIM UE may prioritize activated cells that are not associated with a CQI configuration and/or a PUSCH over configured-only cells that are not associated with a CQI configuration and/or a PUSCH. As shown by reference number 640, the group of configured-only cells that are not associated with a CQI configuration and/or a PUSCH may be assigned a lowest priority and/or may be a most preferred group of cells for baseband resource release.

In some aspects, within the group of configured-only cells that are not associated with a CQI configuration and/or a PUSCH, the multi-SIM UE may prioritize a configured-only SCell relative to other configured-only SCells based at least in part on a frequency associated with the SCell, an amount of bandwidth associated with the SCell during a recent time period (e.g., a current RRC connected state), and/or a throughput (e.g., a downlink throughput and/or an uplink throughput) associated with the SCell during the time period, in a manner similar to that described elsewhere herein.

In some aspects, the multi-SIM UE may identify a quantity of component carriers from which the first SIM is to tune away based at least in part on the quantity of component carriers being associated with cells having a lower priority relative to other cells. In some aspects, the multi-SIM UE may drop one or more TB associated with the quantity of component carriers prior to causing the first SIM to tune away from the quantity of component carriers.

In some aspects, the multi-SIM UE may transmit negative feedback on the quantity of component carriers prior to causing the first SIM to tune away from the quantity of component carriers. The multi-SIM UE may transmit the negative feedback to cause the network (e.g., base station 110) to stop transmitting data to the first SIM via the quantity of component carriers. In this way, the multi-SIM UE may limit an amount of data that is not received by the first SIM based at least in part on the first SIM tuning away from the quantity of component carriers.

As indicated above, FIG. 6 is provided as an example. Other examples may differ from what is described with respect to FIG. 6.

Figure 7:
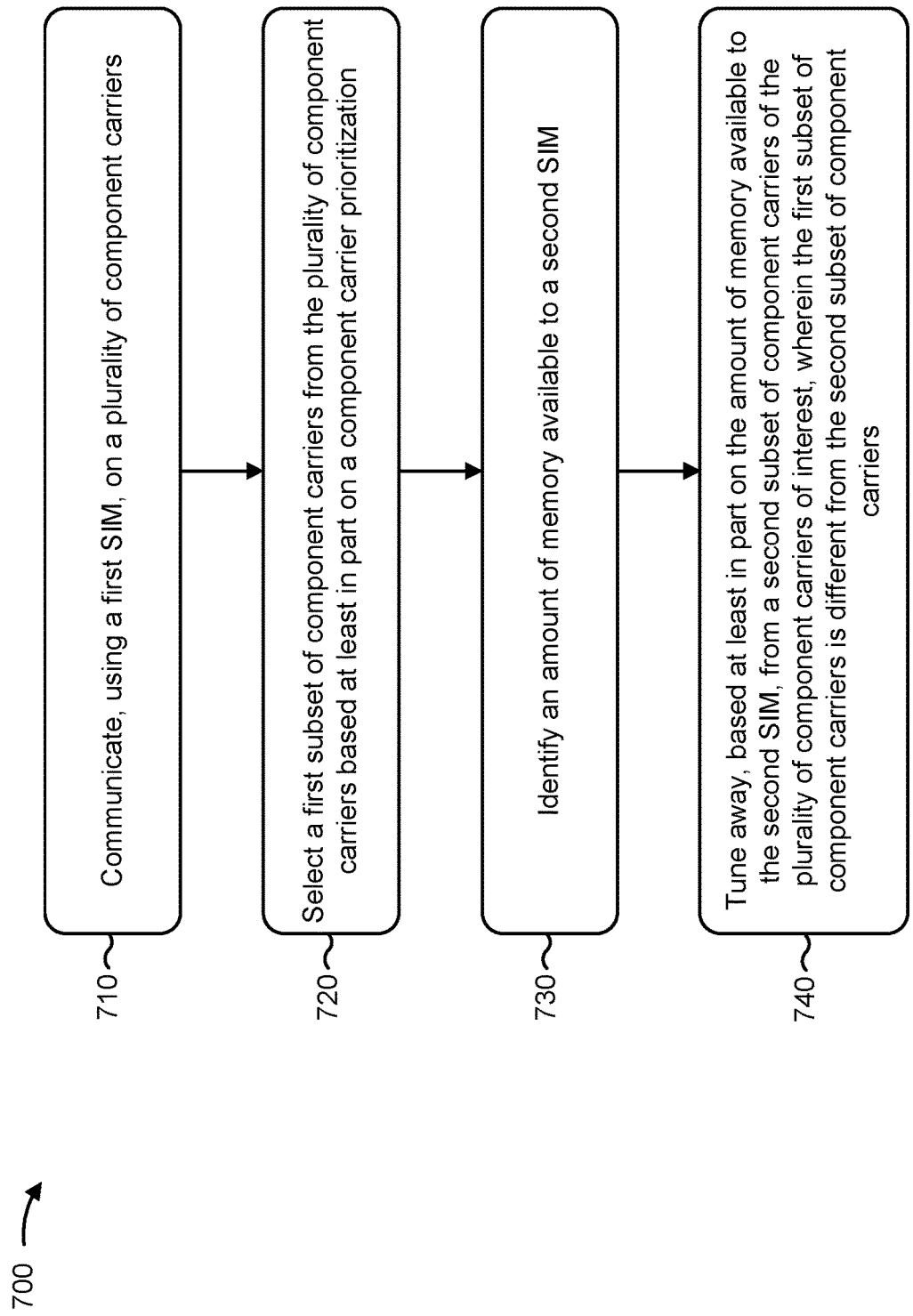
FIG. 7 is a diagram illustrating an example process associated with carrier prioritization in multi-SIM features, in accordance with the present disclosure.

FIG. 7 is a diagram illustrating an example process 700 performed, for example, by a multi-SIM UE, in accordance with the present disclosure. Example process 700 is an example where the multi-SIM UE (e.g., UE 120) performs operations associated with carrier prioritization in multi-SIM features.

As shown in FIG. 7, in some aspects, process 700 may include communicating, using a first SIM, on a plurality of component carriers (block 710). For example, the multi-SIM UE (e.g., using communication manager 140, reception component 802, and/or transmission component 804, depicted in FIG. 8) may communicate, using a first SIM, on a plurality of component carriers, as described above.

As further shown in FIG. 7, in some aspects, process 700 may include selecting a first subset of component carriers from the plurality of component carriers based at least in part on a component carrier prioritization (block 720). For example, the multi-SIM UE (e.g., using communication manager 140 and/or selection component 808, depicted in FIG. 8) may select a first subset of component carriers from the plurality of component carriers based at least in part on a component carrier prioritization, as described above.

As further shown in FIG. 7, in some aspects, process 700 may include identifying an amount of memory available to a second SIM (block 730). For example, the multi-SIM UE (e.g., using communication manager 150 and/or identification component 810, depicted in FIG. 8) may identify an amount of memory available to a second SIM, as described above.

As further shown in FIG. 7, in some aspects, process 700 may include tuning away, based at least in part on the amount of memory available to the second SIM, from a second subset of component carriers of the plurality of component carriers, wherein the first subset of component carriers is different from the second subset of component carriers (block 740). For example, the multi-SIM UE (e.g., using communication manager 150 and/or tuning component 812, depicted in FIG. 8) may tune away, based at least in part on the amount of memory available to the second SIM, from a second subset of component carriers of the plurality of component carriers, wherein the first subset of component carriers is different from the second subset of component carriers, as described above.

Process 700 may include additional aspects, such as any single aspect or any combination of aspects described below and/or in connection with one or more other processes described elsewhere herein.

In a first aspect, the component carrier prioritization is based at least in part on a hierarchical component carrier prioritization.

In a second aspect, alone or in combination with the first aspect, the selection of the first subset of component carriers further comprises selecting a component carrier, of the plurality of component carriers, associated with a primary cell of a master cell group over other component carriers, of the plurality of component carriers.

In a third aspect, alone or in combination with one or more of the first and second aspects, the selection of the first subset of component carriers further comprises selecting a component carrier, of the plurality of component carriers, associated with a primary cell of a secondary cell group over other component carriers, of the plurality of component carriers, that are not associated with a primary cell of a master cell group.

In a fourth aspect, alone or in combination with one or more of the first through third aspects, the selection of the first subset of component carriers further comprises selecting a millimeter wave component carrier, of the plurality of component carriers, over other component carriers, of the plurality of component carriers, that are not associated with a primary cell of a master cell group and are not associated with a primary cell of a secondary cell group.

In a fifth aspect, alone or in combination with one or more of the first through fourth aspects, the selection of the first subset of component carriers further comprises selecting a millimeter wave component carrier, of the plurality of component carriers, over a component carrier, of the plurality of component carriers, that is associated with a frequency that is less than six gigahertz.

In a sixth aspect, alone or in combination with one or more of the first through fifth aspects, the selection of the first subset of component carriers further comprises selecting an activated component carrier, of the plurality of component carriers, over a configured-only component carrier, of the plurality of component carriers.

In a seventh aspect, alone or in combination with one or more of the first through sixth aspects, the selection of the first subset of component carriers further comprises selecting the configured-only component carrier, of the plurality of component carriers, over another configured-only component carrier, of the plurality of component carriers, based at least in part on the configured-only component carrier being associated with a first bandwidth that is greater than a second bandwidth that is associated with the other configured-only component carrier.

In an eighth aspect, alone or in combination with one or more of the first through seventh aspects, the selection of the first subset of component carriers further comprises selecting the configured-only component carrier, of the plurality of component carriers, over another configured-only component carrier, of the plurality of component carriers, based at least in part on the configured-only component carrier being associated with a first throughput over a time period that is greater than a second throughput over the time period that is associated with the other configured-only component carrier.

In a ninth aspect, alone or in combination with one or more of the first through eighth aspects, the selection of the first subset of component carriers further comprises selecting a first component carrier, of the plurality of component carriers, associated with a first data flow over a second component carrier, of the plurality of component carriers, associated with a second data flow based at least in part on the first data flow being associated with a first type of application and the second data flow being associated with a second type of application.

In a tenth aspect, alone or in combination with one or more of the first through ninth aspects, the first data flow is associated with a higher QoS relative to a QoS of the second data flow.

In an eleventh aspect, alone or in combination with one or more of the first through tenth aspects, selecting the first subset of component carriers further comprises deriving a DRB associated with the first data flow, and deriving a mapping between the DRB and the first component carrier, wherein the first component carrier is selected over the second component carrier based at least in part on the mapping between the DRB and the first component carrier.

In a twelfth aspect, alone or in combination with one or more of the first through eleventh aspects, the DRB associated with the first data flow is derived based at least in part on performing downlink packet filtering.

In a thirteenth aspect, alone or in combination with one or more of the first through twelfth aspects, selecting the first subset of component carriers further comprises selecting a first component carrier, of the plurality of component carriers, that has been associated with a first data flow during a time period over a second component carrier, of the plurality of component carriers, based at least in part on the second component carrier being a configured-only component carrier and the second component carrier not having been associated with the first data flow during the time period.

In a fourteenth aspect, alone or in combination with one or more of the first through thirteenth aspects, the selection of the first subset of component carriers further comprises selecting a first component carrier, of the plurality of component carriers, that has not been associated with a first data flow during a time period over a second component carrier, of the plurality of component carriers, that has not been associated with the first data flow during the time period based at least in part on one or more of the first component carrier being associated with a larger bandwidth relative to the second component carrier, or the first component carrier being associated with a larger data throughput during the time period relative to the second component carrier.

In a fifteenth aspect, alone or in combination with one or more of the first through fourteenth aspects, the selection of the first subset of component carriers further comprises identifying one or more radio bearers based at least in part on a flow identifier or a quality of service or priority parameter associated with the one or more radio bearers, identifying one or more cell groups corresponding to the one or more radio bearers, and selecting the first subset of component carriers based at least in part on scheduling information associated with a set of carriers of the one or more cell groups, wherein the first subset of component carriers are included in the set of carriers.

In a sixteenth aspect, alone or in combination with one or more of the first through fifteenth aspects, process 700 includes dropping one or more transport blocks (TBs) associated with the second subset of component carriers prior to tuning away from the second subset of component carriers.

In a seventeenth aspect, alone or in combination with one or more of the first through sixteenth aspects, process 700 includes transmitting negative feedback on the second subset of component carriers prior to tuning away from the second subset of component carriers.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
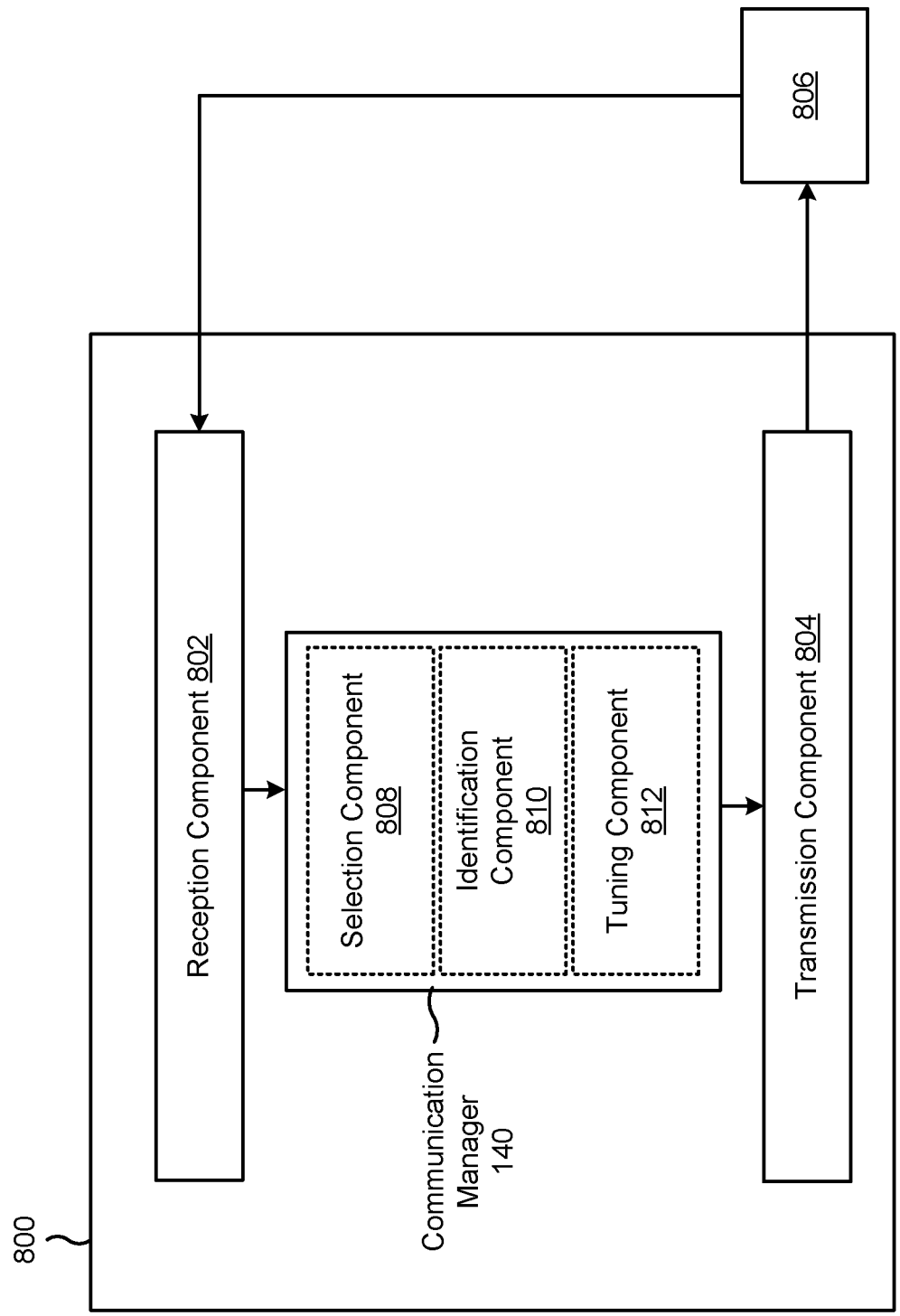
FIG. 8 is a diagram of an example apparatus for wireless communication, in accordance with the present disclosure.

FIG. 8 is a diagram of an example apparatus 800 for wireless communication. The apparatus 800 may be a multi-SIM UE, or a multi-SIM UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a selection component 808, an identification component 810, or a tuning component 812, among other examples.

In some aspects, the apparatus 800 may be configured to perform one or more operations described herein in connection with FIGS. 4-6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the multi-SIM UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the multi-SIM UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digitalto-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the multi-SIM UE described in connection with FIG. 2. In some aspects, the transmission component 804 may be co-located with the reception component 802 in a transceiver.

The reception component 802 and/or the transmission component 804 may communicate, using a first SIM, on a plurality of component carriers. The selection component 808 may select a first subset of component carriers from the plurality of component carriers based at least in part on a component carrier prioritization. The identification component 810 may identify an amount of memory available to a second SIM. The tuning component 812 may tune away from a second subset of component carriers of the plurality of component carriers, wherein the first subset of component carriers is different from the second subset of component carriers.

The selection component 808 may select a first component carrier, of the plurality of component carriers, that has been associated with a first data flow during a time period over a second component carrier, of the plurality of component carriers, based at least in part on the second component carrier being a configured-only component carrier and the second component carrier not having been associated with the first data flow during the time period.

The tuning component 812 may drop one or more TBs associated with the second subset of component carriers prior to tuning away from the second subset of component carriers.

The transmission component 804 may transmit negative feedback on the second subset of component carriers prior to tuning away from the second subset of component carriers.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a multi-SIM UE, comprising: communicating, using a first SIM, on a plurality of component carriers; selecting a first subset of component carriers from the plurality of component carriers based at least in part on a component carrier prioritization; identifying an amount of memory available to a second SIM; and tuning away, based at least in part on the amount of memory available to the second SIM, from a second subset of component carriers of the plurality of component carriers, wherein the first subset of component carriers is different from the second subset of component carriers.

Aspect 2: The method of Aspect 1, wherein the component carrier prioritization is based at least in part on a hierarchical component carrier prioritization.

Aspect 3: The method of one or more of Aspects 1 and 2, wherein the selection of the first subset of component carriers further comprises selecting a component carrier, of the plurality of component carriers, associated with a primary cell of a master cell group over other component carriers, of the plurality of component carriers.

Aspect 4: The method of one or more of Aspects 1 through 3, wherein the selection of the first subset of component carriers further comprises selecting a component carrier, of the plurality of component carriers, associated with a primary cell of a secondary cell group over other component carriers, of the plurality of component carriers, that are not associated with a primary cell of a master cell group.

Aspect 5: The method of one or more of Aspects 1 through 4, wherein the selection of the first subset of component carriers further comprises selecting a millimeter wave component carrier, of the plurality of component carriers, over other component carriers, of the plurality of component carriers, that are not associated with a primary cell of a master cell group and are not associated with a primary cell of a secondary cell group.

Aspect 6: The method of one or more of Aspects 1 through 5, wherein the selection of the first subset of component carriers further comprises selecting a millimeter wave component carrier, of the plurality of component carriers, over a component carrier, of the plurality of component carriers, that is associated with a frequency that is less than six gigahertz.

Aspect 7: The method of one or more of Aspects 1 through 6, wherein the selection of the first subset of component carriers further comprises selecting an activated component carrier, of the plurality of component carriers, over a configured-only component carrier, of the plurality of component carriers.

Aspect 8: The method of Aspect 7, wherein the selection of the first subset of component carriers further comprises selecting the configured-only component carrier, of the plurality of component carriers, over another configured-only component carrier, of the plurality of component carriers, based at least in part on the configured-only component carrier being associated with a first bandwidth that is greater than a second bandwidth that is associated with the other configured-only component carrier.

Aspect 9: The method of Aspect 7, wherein the selection of the first subset of component carriers further comprises selecting the configured-only component carrier, of the plurality of component carriers, over another configured-only component carrier, of the plurality of component carriers, based at least in part on the configured-only component carrier being associated with a first throughput over a time period that is greater than a second throughput over the time period that is associated with the other configured-only component carrier.

Aspect 10: The method of one or more of Aspects 1 through 9, wherein the selection of the first subset of component carriers further comprises selecting a first component carrier, of the plurality of component carriers, associated with a first data flow over a second component carrier, of the plurality of component carriers, associated with a second data flow based at least in part on the first data flow being associated with a first type of application and the second data flow being associated with a second type of application.

Aspect 11: The method of Aspect 10, wherein the first data flow is associated with a higher QoS relative to a QoS of the second data flow.

Aspect 12: The method of Aspect 10, wherein selecting the first subset of component carriers further comprises deriving a DRB associated with the first data flow; and deriving a mapping between the DRB and the first component carrier, wherein the first component carrier is selected over the second component carrier based at least in part on the mapping between the DRB and the first component carrier.

Aspect 13: The method of Aspect 12, wherein the DRB associated with the first data flow is derived based at least in part on performing downlink packet filtering.

Aspect 14: The method of one or more of Aspects 1 through 13, wherein the selection of the first subset of component carriers further comprises selecting a first component carrier, of the plurality of component carriers, that has been associated with a first data flow during a time period over a second component carrier, of the plurality of component carriers, based at least in part on the second component carrier being a configured-only component carrier and the second component carrier not having been associated with the first data flow during the time period.

Aspect 15: The method of one or more of Aspects 1 through 15, wherein the selection of the first subset of component carriers further comprises selecting a first component carrier, of the plurality of component carriers, that has not been associated with a first data flow during a time period over a second component carrier, of the plurality of component carriers, that has not been associated with the first data flow during the time period based at least in part on one or more of: the first component carrier being associated with a larger bandwidth relative to the second component carrier, or the first component carrier being associated with a larger data throughput during the time period relative to the second component carrier.

Aspect 16: The method of one or more of Aspects 1 through 15, wherein the selection of the first subset of component carriers further comprises identifying one or more radio bearers based at least in part on a flow identifier or a quality of service or priority parameter associated with the one or more radio bearers; identifying one or more cell groups corresponding to the one or more radio bearers; and selecting the first subset of component carriers based at least in part on scheduling information associated with a set of carriers of the one or more cell groups, wherein the first subset of component carriers are included in the set of carriers.

Aspect 17: The method of one or more of Aspects 1 through 16, further comprising dropping one or more TBs associated with the second subset of component carriers prior to tuning away from the second subset of component carriers.

Aspect 18: The method of one or more of Aspects 1 through 17, further comprising transmitting negative feedback on the second subset of component carriers prior to tuning away from the second subset of component carriers.

Aspect 19: An apparatus for wireless communication at a device, comprising a processor; memory coupled with the processor; and instructions stored in the memory and executable by the processor to cause the apparatus to perform the method of one or more of Aspects 1 through 18.

Aspect 20: A device for wireless communication, comprising a memory and one or more processors coupled to the memory, the one or more processors configured to perform the method of one or more of Aspects 1 through 18.

Aspect 21: An apparatus for wireless communication, comprising at least one means for performing the method of one or more of Aspects 1 through 18.

Aspect 22: A non-transitory computer-readable medium storing code for wireless communication, the code comprising instructions executable by a processor to perform the method of one or more of Aspects 1 through 18.

Aspect 23: A non-transitory computer-readable medium storing a set of instructions for wireless communication, the set of instructions comprising one or more instructions that, when executed by one or more processors of a device, cause the device to perform the method of one or more of Aspects 1 through 18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a multi-subscriber identity module (SIM) user equipment (UE) for wireless communication, comprising:
   one or more memories; and
   one or more processors, coupled to the one or more memories, configured to:
      communicate, using a first SIM, on a plurality of component carriers;
      select, based at least in part on a component carrier prioritization, a first component carrier, of the plurality of component carriers, over a second component carrier, of the plurality of component carriers,
      wherein the first component carrier is associated with a first data flow during a time period, and
      wherein selecting the first component carrier over the second component carrier is based at least in part on the second component carrier being a configured-only component carrier and whether the second component carrier is associated with the first data flow during the time period; and
   perform a communication based at least in part on selecting the first component carrier over the second component carrier.

2. The apparatus of claim 1, wherein the component carrier prioritization is based at least in part on a hierarchical component carrier prioritization.

3. The apparatus of claim 1, wherein the one or more processors, to select the first component carrier, are further configured to select a component carrier, of the plurality of component carriers, associated with a primary cell of a master cell group over other component carriers, of the plurality of component carriers.

4. The apparatus of claim 1, wherein the one or more processors, to select the first component carrier, are further configured to select a component carrier, of the plurality of component carriers, associated with a primary cell of a secondary cell group over other component carriers, of the plurality of component carriers, that are not associated with a primary cell of a master cell group.

5. The apparatus of claim 1, wherein the one or more processors, to select the first component carrier, are further configured to select a millimeter wave component carrier, of the plurality of component carriers, over other component carriers, of the plurality of component carriers, that are not associated with a primary cell of a master cell group and are not associated with a primary cell of a secondary cell group.

6. The apparatus of claim 1, wherein the one or more processors, to select the first component carrier, are further configured to select a millimeter wave component carrier, of the plurality of component carriers, over a component carrier, of the plurality of component carriers, that is associated with a frequency that is less than six gigahertz.

7. The apparatus of claim 1, wherein the one or more processors, to select the first component carrier, are further configured to select an activated component carrier, of the plurality of component carriers, over a configured-only component carrier, of the plurality of component carriers.

8. The apparatus of claim 7, wherein the one or more processors, to select the first component carrier, are further configured to select the first component carrier, of the plurality of component carriers, over another component carrier, of the plurality of component carriers, based at least in part on the first component carrier being associated with a first bandwidth that is greater than a second bandwidth that is associated with the other component carrier.

9. The apparatus of claim 7, wherein the one or more processors, to select the first component carrier, are further configured to select the first component carrier, of the plurality of component carriers, over another component carrier, of the plurality of component carriers, based at least in part on the first component carrier being associated with a first throughput over the time period that is greater than a second throughput over the time period that is associated with the other component carrier.

10. The apparatus of claim 1, wherein the one or more processors, to select the first component carrier, are further configured to select the first component carrier associated with the first data flow over the second component carrier associated with a second data flow based at least in part on the first data flow being associated with a first type of application and the second data flow being associated with a second type of application.

11. The apparatus of claim 10, wherein the first data flow is associated with a higher quality of service (QoS) relative to a QoS of the second data flow.

12. The apparatus of claim 10, wherein the one or more processors, to select the first component carrier, are configured to:
   derive a data radio bearer (DRB) associated with the first data flow; and
   derive a mapping between the DRB and the first component carrier, wherein the first component carrier is selected over the second component carrier based at least in part on the mapping between the DRB and the first component carrier.

13. The apparatus of claim 12, wherein the DRB associated with the first data flow is derived based at least in part on performing downlink packet filtering.

14. The apparatus of claim 1, wherein the one or more processors, to select the first component carrier, are further configured to:
   identify one or more radio bearers based at least in part on a flow identifier or a quality of service or priority parameter associated with the one or more radio bearers;
   identify one or more cell groups corresponding to the one or more radio bearers; and
   select the first component carrier based at least in part on scheduling information associated with a set of component carriers of the one or more cell groups, wherein the first component carrier is included in the set of component carriers.

15. The apparatus of claim 1, wherein the one or more processors are further configured to:
   drop one or more transport blocks (TBs) associated with a second component carriers fo the plurality of component carriers; and
   tuning away from the second component carriers after dropping the one or more TBs.

16. The apparatus of claim 1, wherein the one or more processors are further configured to:
- transmit negative feedback on a second component carriers fo the plurality of component carriers; and
- tuning away from the second component carriers after transmitting the negative feedback.

17. A method of wireless communication performed by a multi-subscriber identity module (SIM) user equipment (UE), comprising:
- communicating, using a first SIM, on a plurality of component carriers;
- selecting, based at least in part on a component carrier prioritization, a first component carrier, of the plurality of component carriers, over a second component carrier, of the plurality of component carriers,
- wherein the first component carrier is associated with a first data flow during a time period, and
- wherein selecting the first component carrier over the second component carrier is based at least in part on the second component carrier being a configured-only component carrier and whether the second component carrier is associated with the first data flow during the time period; and
- performing a communication based at least in part on selecting the first component carrier over the second component carrier.

18. The method of claim 17, wherein the selection of the first component carrier further comprises selecting a component carrier, of the plurality of component carriers, associated with a primary cell of a master cell group over other component carriers, of the plurality of component carriers.

19. The method of claim 17, wherein the selection of the first component carrier further comprises selecting a component carrier, of the plurality of component carriers, associated with a primary cell of a secondary cell group over other component carriers, of the plurality of component carriers, that are not associated with a primary cell of a master cell group.

20. The method of claim 17, wherein the selection of the first component carrier further comprises selecting a millimeter wave component carrier, of the plurality of component carriers, over other component carriers, of the plurality of component carriers, that are not associated with a primary cell of a master cell group and are not associated with a primary cell of a secondary cell group.

21. The method of claim 17, wherein the selection of the first component carrier further comprises selecting a millimeter wave component carrier, of the plurality of component carriers, over a component carrier, of the plurality of component carriers, that is associated with a frequency that is less than six gigahertz.

22. The method of claim 17, wherein the selection of the first component carrier further comprises selecting an activated component carrier, of the plurality of component carriers, over a configured-only component carrier, of the plurality of component carriers.

23. A non-transitory computer-readable medium storing a set of instructions for wireless communication, the set of instructions comprising:
- one or more instructions that, when executed by one or more processors of a multi-subscriber identity module (SIM) user equipment (UE), cause the multi-SIM UE to:
  - communicate, using a first SIM, on a plurality of component carriers;
  - select, based at least in part on a component carrier prioritization, a first component carrier, of the plurality of component carriers, over a second component carrier, of the plurality of component carriers,
  - wherein the first component carrier is associated with a first data flow during a time period, and
  - wherein selecting the first component carrier over the second component carrier is based at least in part on the second component carrier being a configured-only component carrier and whether the second component carrier is associated with the first data flow during the time period; and
  - perform a communication based at least in part on selecting the first component carrier over the second component carrier.

24. The non-transitory computer-readable medium of claim 23, wherein the one or more instructions further cause the multi-SIM UE to:
- drop one or more transport blocks (TBs) associated with a second subset of component carriers of the plurality of component carriers; and
- tune away from the second subset of component carriers after dropping the one or more TBs.

25. The non-transitory computer-readable medium of claim 23, wherein the one or more instructions further cause the multi-SIM UE to:
- transmit negative feedback on a second subset of component carriers of the plurality of component carriers; and prior to tuning away from the second subset of component carriers after transmitting the negative feedback.

26. An apparatus of a multi-subscriber identity module (SIM) user equipment (UE) for wireless communication, comprising:
- means for communicating, using a first SIM, on a plurality of component carriers;
- means for selecting, based at least in part on a component carrier prioritization, a first component carrier, of the plurality of component carriers, over a second component carrier, of the plurality of component carriers,
- wherein the first component carrier is associated with a first data flow during a time period, and
- wherein selecting the first component carrier over the second component carrier is based at least in part on the second component carrier being a configured-only component carrier and whether the second component carrier is associated with the first data flow during the time period; and
- means for performing a communications based at least in part on selecting the first component carrier over the second component carrier.

27. The apparatus of claim 26, further comprising means for selecting a component carrier, of the plurality of component carriers, associated with a primary cell of a master cell group over other component carriers, of the plurality of component carriers.

28. The apparatus of claim 26, further comprising means for selecting a component carrier, of the plurality of component carriers, associated with a primary cell of a secondary cell group over other component carriers, of the plurality of component carriers, that are not associated with a primary cell of a master cell group.

29. The apparatus of claim 1, wherein the one or more processors are further configured to:
- identify an amount of memory available to a second SIM.

30. The apparatus of claim 29, wherein the one or more processors are further configured to:
- tune away, based at least in part on the amount of memory available to the second SIM, from a second subset of component carriers of the plurality of component carriers, wherein the first component carrier is different from the second subset of component carriers.

* * * * *